US008821329B2

(12) United States Patent
Wickliffe et al.

(10) Patent No.: US 8,821,329 B2
(45) Date of Patent: *Sep. 2, 2014

(54) BICYCLE CHAIN RINGS WITH RAMPS

(71) Applicant: Wick Werks, LLC, Ogden, UT (US)

(72) Inventors: Christopher A. Wickliffe, Ogden, UT (US); Eldon Goates, Colorado Springs, CO (US)

(73) Assignee: Wick Werks, LLC, Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/966,158

(22) Filed: Aug. 13, 2013

(65) Prior Publication Data
US 2013/0331210 A1 Dec. 12, 2013

Related U.S. Application Data

(63) Continuation of application No. 13/338,181, filed on Dec. 27, 2011, now Pat. No. 8,506,436, which is a continuation of application No. 12/284,339, filed on Sep. 18, 2008, now Pat. No. 8,092,329, which is a continuation-in-part of application No. 11/397,234, filed on Apr. 3, 2006.

(51) Int. Cl.
F16H 7/18 (2006.01)
F16H 55/30 (2006.01)
B62M 9/10 (2006.01)
B62M 9/12 (2006.01)

(52) U.S. Cl.
CPC ........ B62M 9/12 (2013.01); B62M 9/105 (2013.01)
USPC .......................................... 474/140; 474/160

(58) Field of Classification Search
USPC .................... 474/140, 152, 158, 160, 164
See application file for complete search history.

(56) References Cited

U.S. PATENT DOCUMENTS 5,192,248 A * 3/1993 Nagano ......................... 474/140
5,458,543 A * 10/1995 Kobayashi .................... 474/160
5,464,373 A * 11/1995 Leng ............................. 474/140

OTHER PUBLICATIONS

Real Design Chainring and Box Photographs.

* cited by examiner

Primary Examiner — William E Dondero
(74) Attorney, Agent, or Firm — Taft Stettinius & Hollister LLP; Brian Lynch

(57) ABSTRACT

Embodiments of the present invention include bicycle chain rings for bicycles having specially shaped ramps with lifting surfaces for improved up-shifting performance. Additional embodiments of the bicycle chain rings of the present invention may be configured with one or more additional features formed within the chain rings including a transition slide, a tapered ramp face, a ramp bridge, a ramp lead, a trailing transition slide and a wear pin.

22 Claims, 29 Drawing Sheets

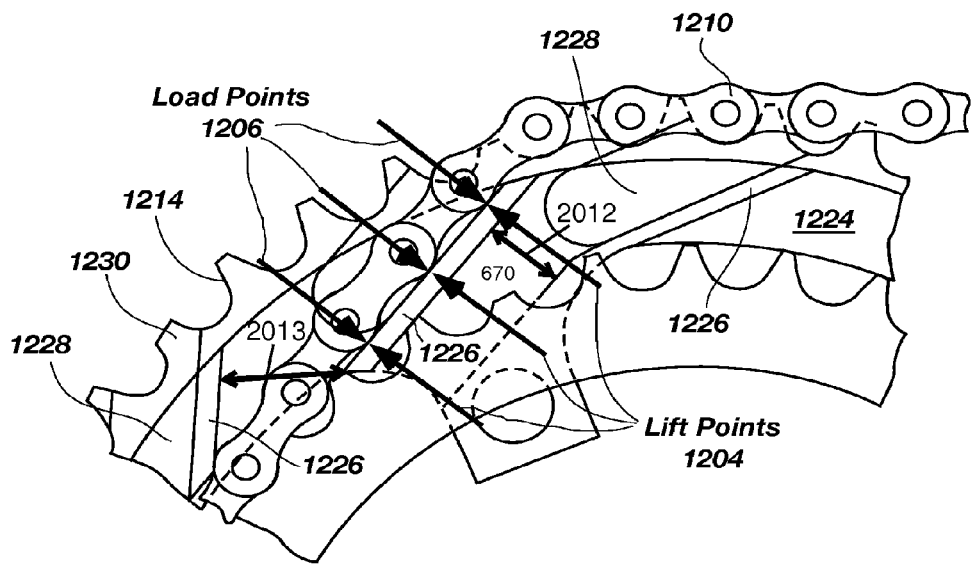
FIG. 31A
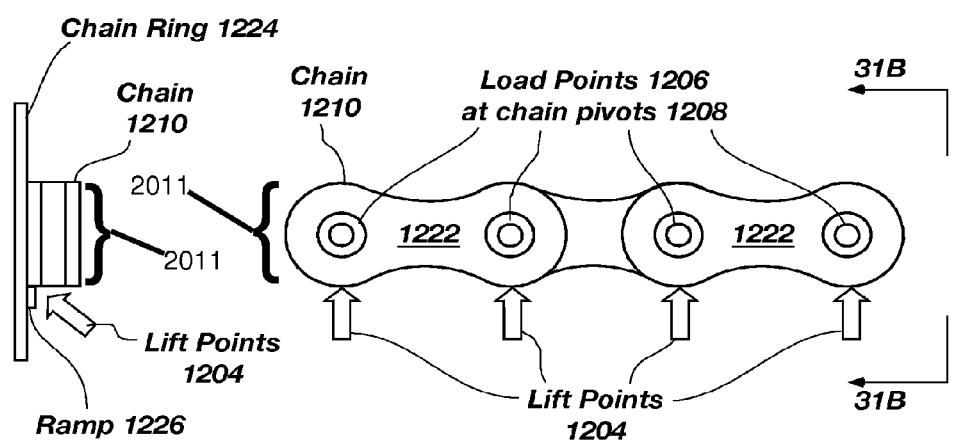
FIG. 31B   FIG. 31C

BICYCLE CHAIN RINGS WITH RAMPS

CROSS-REFERENCE TO RELATED APPLICATIONS

This is a U.S. continuation patent application of U.S. patent application Ser. No. 13/338,181, titled, "BICYCLE CHAIN RINGS WITH RAMPS", filed Dec. 27, 2011, and issued Aug. 13, 2013 as U.S. Pat. No. 8,506,436, which in turn is a continuation of U.S. patent application Ser. No. 12/284,339, titled, "BICYCLE CHAIN RINGS WITH RAMPS", filed Sep. 18, 2008, and issued Jan. 10, 2012 as U.S. Pat. No. 8,092,329, which in turn is a continuation-in-part (CIP) application of U.S. patent application Ser. No. 11/397,234, titled "BICYCLE CHAIN RINGS," filed on Apr. 3, 2006, pending, which in turn claims priority to provisional patent application No. 60/712,414, titled "BICYCLE CHAIN RINGS," filed on Sep. 27, 2005. The contents of all of the aforementioned patents and patent applications are hereby incorporated by reference for all purposes as if fully set forth herein.

This continuation patent application is also related to U.S. design patent application Ser. No. 29/254,870, titled "BICYCLE CHAIN RINGS," filed on Mar. 1, 2006, and issued Apr. 17, 2007 as U.S. design Pat. No. D540,718; U.S. design patent application Ser. No. 29/310,958, titled "MEDIUM MOUNTAIN BIKE CHAIN RING", filed Sep. 18, 2008, and issued Sep. 8, 2009 as U.S. design Pat. No. D599,719; U.S. design patent application Ser. No. 29/310,955, titled "LARGE CYCLOCROSS BIKE CHAIN RING", filed Sep. 18, 2008, and issued Sep. 8, 2009 as U.S. design Pat. No. D599,717; U.S. design patent application Ser. No. 29/310,954, titled "LARGE ROAD BIKE CHAIN RING", filed Sep. 18, 2008, and issued Sep. 8, 2009 as U.S. design Pat. No. D599,716; U.S. design patent application Ser. No. 29/310,953, titled "MEDIUM ROAD BIKE CHAIN RING", filed Sep. 18, 2008, and issued Sep. 1, 2009 as U.S. design Pat. No. D599,255; U.S. design patent application Ser. No. 29/310,957, titled "LARGE MOUNTAIN BIKE CHAIN RING", filed Sep. 18, 2008, and issued Sep. 8, 2009 as U.S. design Pat. No. D599,718. The contents of all of the aforementioned related patents and applications are also incorporated by reference for all purposes as if fully set forth herein.

BACKGROUND OF THE INVENTION

1. Field of the Invention

The present invention relates generally to bicycle chain rings used in bicycle drive trains. More particularly, this invention relates to bicycle chain rings with ramps and other features for improved shifting performance.

2. Description of Related Art

Conventional bicycle gear systems typically include a crankset including two or three chain rings affixed to a crank arm spider and a separate simple crank arm. The crank arms of a crankset are configured to receive pedals on one end and to be affixed at the other end to a bottom bracket spindle with bearings for rotation. Conventional bicycle gear systems also typically include a rear cog set, occasionally referred to as a cassette or cluster, having one to ten gears with teeth configured to rotate a rear wheel through a hub with bearing mechanism. Conventional bicycle gear systems further include a bicycle chain that is driven by the chain rings of the crankset which, in turn, drive the cogs of the rear cog set. The gears of the bicycle may be selectively changed using shifters with control wires attached to front and rear derailleurs that move the chain from adjacent chain rings or cogs.

Conventional front derailleurs used with cranksets having two or three chain rings push the chain from one ring to the next using lateral motion. During an up-shift, for example, the chain guide of a front derailleur pushes laterally against the side of a chain until the links of the chain finally catch on a tooth of the larger adjacent chain ring and all subsequent links of the chain follow until the chain is aligned with the teeth of the larger adjacent chain ring. A down-shift is achieved by pushing laterally against the chain resting on the larger chain ring until the chain can fall down to the smaller chain ring.

This conventional method of pushing laterally against the chain with a chain guide provides adequate shifting for most purposes. However, under extreme loading, such as sprinting or out of the saddle climbing, there is a need for quicker shifting, especially up-shifting. A number of solutions have been proposed to improve shifting performance of a front derailleur.

The inventor of the present application has invented improved front derailleurs, see e.g., U.S. Pat. Nos. 6,454,671 and 7,025,698, both to Wickliffe. These prior patents approach the problem of improved shifting by changing the way a front derailleur shifts a chain from chain ring to chain ring—by using a chain guide that physically lifts up the bicycle chain during up-shifts, and pulls down the bicycle chain during down-shifts. This is in contrast to conventional front derailleurs with their predominantly lateral movement of the bicycle chain, during both up- and down-shifts.

Other approaches to improving front derailleur shifting performance have focused on redesigning bicycle chains by shaping outer chain links to more readily grab conventional teeth found on conventional chain rings. By shaping outer chain links of a bicycle chain to bow out laterally or to have chamfered or tapered inner surfaces, such chains may be able to grab chain ring teeth quicker.

Still other approaches to improving front derailleur shifting performance have focused on redesigning the chain rings themselves. For example, U.S. Pat. No. 5,078,653 to Nagano discloses a larger chain ring with selected teeth having reduced height relative to adjacent teeth, i.e., the crests of the selected teeth having been uniformly cut off to reduce height. Additionally, a short pin has been inserted into the inside of the larger chain ring just below the trimmed teeth and opposed to the smaller chain ring. The arrangement disclosed in the '653 patent, purports to facilitate quicker down-shifts by allowing the chain to disengage at the trimmed teeth and be lowered onto the teeth of a smaller chain ring via the short pin. However, there is no indication that the invention disclosed in the '653 patent improves up-shifting, especially during high loads as mentioned above.

U.S. Pat. No. 6,666,786 to Yahata discloses another improvement to down-shifting performance through the use of chamfered chain ring teeth. However, like the '653 patent, the '786 patent does not address or attempt to solve the problem of achieving improved up-shifting.

U.S. Pat. No. 5,413,534 to Nagano and U.S. Pat. No. 6,572,500 to Tetsuka are directed toward redesigning a conventional chain ring to improve up-shifting. These two patents disclose the use of pins, or a pin in combination with tooth chamfering, to improve up-shifting. However, in both patents the pin or teeth engage a given chain link at the point directly between chain link rollers. This configuration tends to be problematic because the load points of a bicycle chain are concentrated at each of the chain link rollers (bushings surrounding pins). Thus, the use of pins as disclosed in the '534 and '500 patents to Nagano and Tetsuka, respectively, may increase stress on the chain especially during high loads and, thus, could lead to increased wear and reduce longevity of the chain.

Similarly, U.S. Pat. No. 5,876,296 to Hsu et al. discloses the use of an axially oriented recess in combination with a support protrusion to aid in up-shifting. U.S. Pat. No. 5,738,603 to Schmidt et al. discloses a chain ring with pins, chamfered teeth and missing teeth to aid in shifting. However, neither of these two patents appears to solve the problem of the added stress to the chain from the "support protrusion" or the "pins".

FIG. 30A is a diagram illustrating a conventional chain ring using two pins to aid in shifting a chain during an up-shift. The two pins 1202 lift and drop the chain 1210 onto the larger chain ring 1212 during an up-shift. The pins 1202 provide lift in the direction of arrows 1204. The set of two pins 1202 shown in FIG. 30 are generally replicated at a location 180° opposite on the chain ring 1212. So, in a given rotation of the chain ring 1212, there are only two potential shift points that can utilize the pins 1202. Additionally, the load points 1206 are distributed along the chain pivots 1208. Thus, the lift 1204 provided by pins 1202 do not match the load points 1206 of chain 1210. When down-shifting under load with such conventional chain rings, the chain 1210 often keeps engaging the teeth 1214 due to tension and the height of all the teeth 1214 not allowing a front derailleur cage (not shown) to physically move the chain 1210 past the teeth 1214. This results in slower down-shifts, especially under load.

FIG. 30B is a diagram illustrating a "see saw action", shown at curved double headed arrows 1218, that can occur with an unstable lift point 1216 of a single pin 1201 of a conventional chain ring (not shown) lifting upon a chain 1210. FIG. 30B also illustrates that a chain 1210 is comprised of alternating sets of inner links 1220 and outer links 1222. Conventional chain ring pins 1202 can only grab an outer link 1222. Pins 1222 ordinarily do not contact an inner link 1220. Consequently, there is approximately a 50% chance the chain 1210 will grab a pin 1202 and hopefully hold on long enough to engage the teeth 1214 (FIG. 30A). As shown in FIG. 30B, conventional chain ring designs put the entire chain load on a small contact area between the pin 1202 and an outer link 1222 of the chain 1210. The chain 1210 often slips off the pin 1202. This problem is most noticeable under load and with wear to the pin 1202.

Accordingly, there still exists a need in the art for a bicycle chain ring that achieves improved shifting performance without increasing the stress on the bicycle chain, thereby addressing at least some of the shortcomings of the prior art.

SUMMARY OF THE INVENTION

An embodiment of a bicycle chain ring is disclosed. The chain ring may include ramps disposed about an inner surface of the bicycle chain ring for engaging one or more outer chain links of a bicycle chain during an up-shift, each ramp configured with a lifting surface and a ramp face, each of the ramps further comprising a transition slide disposed along a leading edge of each ramp, the transition slide forming a bevel tapering the lifting surface back to a ramp face at an inner periphery of an inner opening of the chain ring.

Another embodiment of a bicycle chain ring is disclosed. The chain ring may include a ramp formed on an inner surface of the bicycle chain ring, the ramp comprising a raised structure with a lifting surface perpendicular to a plane of the inner surface. The chain ring may further include a ramp face adjacent to the lifting surface, the ramp face forming a planar surface tapering a thickness of the bicycle chain ring in a radial direction. The chain ring may further comprise the lifting surface and ramp face configured for engaging one or more outer chain links of a bicycle chain during an up-shift. The chain ring may further include a wear pin embedded within the raised structure and adjacent the lifting surface for minimizing wear to the lifting surface.

BRIEF DESCRIPTION OF THE DRAWINGS

The following drawings illustrate exemplary embodiments for carrying out the invention. Like reference numerals refer to like parts in different views or embodiments of the present invention in the drawings.

FIG. 31A is a diagram of an embodiment of a chain ring with ramps according to the present invention.

FIG. 31B is an end-on view of a chain engaging a ramp of a chain ring according to an embodiment of the present invention.

FIG. 31C illustrates a few links of a chain with its load points located at the chain pivots and corresponding lift points.

DETAILED DESCRIPTION OF THE INVENTION

Embodiments of the present invention include chain rings for bicycles having specially shaped ramps, tapers and profiled teeth for improved shifting. The embodiments of the chain rings of the present invention may be assembled with a crank arm and spider with mounting bolts to form a crankset. The embodiments of the chain rings of the present invention may also be retrofitted to existing bicycle cranksets as replacement chain rings and can be configured for any standard bolt on configuration and number of teeth. For example and not by way of limitation, the embodiments of chain rings of the present invention may include middle chain rings in 32 tooth "compact" or 34 tooth "standard" configurations with either four or five bolt mounting structures. Additionally, the embodiments of chain rings of the present invention may include outer (large or big) chain rings in 44 tooth "compact" or 46 tooth "standard" configurations with either four or five bolt mounting structures. In road bike configurations (dual chain ring or "double crankset"), the embodiments of chain rings of the present invention may include outer or large chain rings in 53 tooth "standard" configuration or medium chain rings in 39 tooth "standard" configuration, both with five bolt mounting structures. Of course, any number of teeth or bolt patterns may be used with the chain rings of the present invention and all such variations are considered to be within the scope of the present invention.

FIG. 31A is a partial diagram of an embodiment of a chain ring 1224 with ramps according to the present invention. The chain ring 1224 has a plurality of ramps 1226 (three shown in partial view) spread out every 3-5 teeth depending on chain ring size and particular location. This configuration of ramps 1226 spread around the inner surface of the chain ring 1224, provides a fast, positive engagement of the chain 1210. This fast, positive engagement of the chain 1210 is relatively independent of location in the crankset revolution during which a shift of gears is initiated. FIG. 31A further illustrates that lift points 1204 (solid arrows) on ramp 1226 are equal in number and opposite in direction to the load points 1206 (solid arrows) from chain 1210. FIG. 31A also illustrates a ramp face 1228 and a contoured or low profile tooth 1230 above each ramp 1226. The contoured tooth 1230 and ramp face 1228 allows the chain 1210 to lean in and mesh smoothly onto the teeth 1214 of chain ring 1224. The contoured teeth 1230 of chain ring 1224 allow a front derailleur cage (not shown) to physically move the chain 1210 past a cut or contoured tooth 1230, thus allowing for faster down-shifts, especially under load.

Figure 30A:
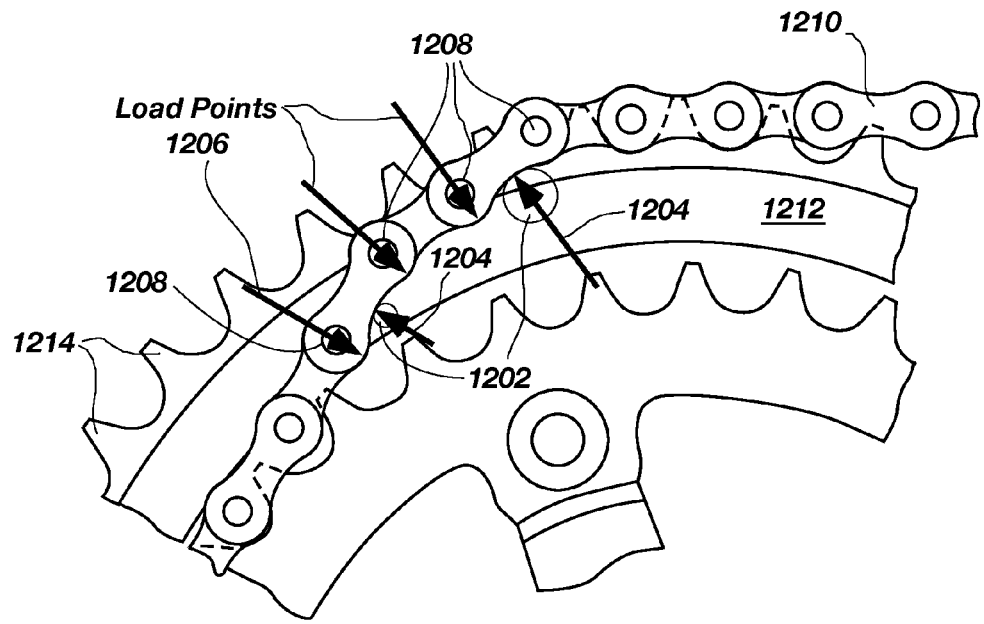
FIG. 30A is a diagram illustrating a conventional chain ring using two pins to aid in shifting a chain during an up-shift.
Figure 30B:
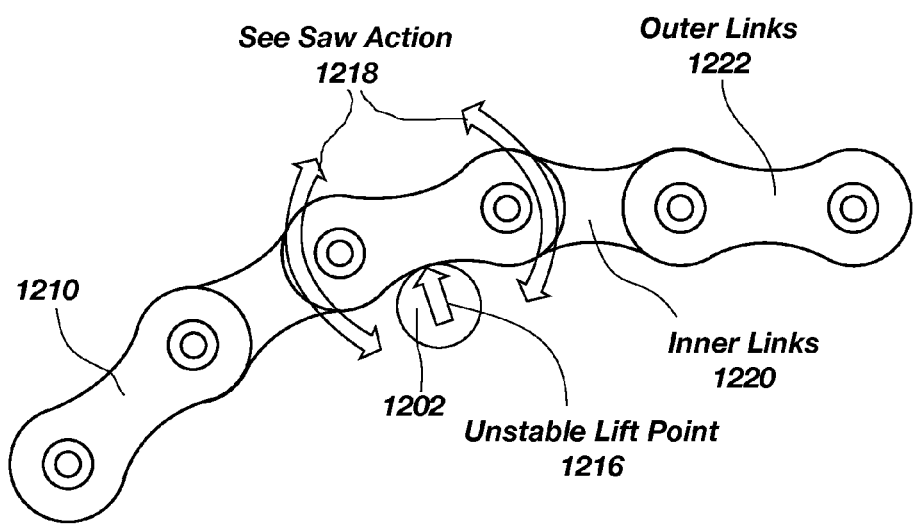
FIG. 30B is a diagram illustrating a problem that can occur with an unstable lift point of a single pin of a conventional chain ring lifting upon a chain.

In FIG. 31A the flat channel 670 has a minimum width 2012 between the lifting points 1204 and the closest lifting ramp 1226 that is greater than the height 2011 of the chain. In FIG. 31A, the maximum channel width 2013 between ramps 1226 is shown to be less than about two link heights 2011. FIG. 31B is an end-on view of a chain engaging a ramp of a chain ring according to an embodiment of the present invention. FIG. 31C illustrates a few links of a chain 1210 with its load points 1206 located at the chain pivots 1208 and corresponding lift points 1204 along outer links 1222. The chain has a chain height 2011 of approximately twice the distance from a lift point 1204 to the center of the closest chain pivot 1208. As can be seen from FIGS. 31B-31C, chain ring 1224 lifts the chain 1210 from the bottom corner of the outer links 1222 directly below the load points 1206 of the chain 1210. The ramps 1226 of chain ring 1224 provide a superior engagement without the slippage of conventional chain ring pins 1202 (FIGS. 30A-30B). The ramps 1226 of chain ring 1224 further provide more contact area than conventional pins 1202 and lift directly below multiple load points 1206 of the chain 1210.

An embodiment of a bicycle chain ring is disclosed. The bicycle chain ring may include a plurality of ramps disposed about an inner surface of the bicycle chain ring, wherein each of the plurality of ramps is configured with a lifting surface to engage a plurality of outer chain links of a bicycle chain during an up-shift. Lifting surfaces on each of the ramps may include linear, bilinear, multilinear, or curved profiles according to various embodiments of the bicycle chain ring. The ramps end at a trough or recess between two adjacent teeth according to another embodiment of the present invention. Furthermore one of the two adjacent teeth may be partially cutoff, according to yet another embodiment of the present invention.

Another embodiment of a bicycle chain ring may include an inside taper in the bicycle chain ring. The inside taper may be located adjacent to each of the plurality of ramps. The inside taper may provide decreasing bicycle chain ring thickness in a direction opposite normal rotation (forward motion) of the bicycle chain ring during an up-shift. According to another embodiment, the bicycle chain ring may further include partially cutoff teeth located radially outward from an outer end of each of the plurality of ramps. According to another embodiment, the bicycle chain ring may further include a plurality of non-partially cutoff teeth in between each of the partially cutoff teeth. According to a further embodiment, each non-partially cutoff tooth may have an inside bevel located proximate its tip. According to a still further embodiment, the bicycle chain ring may further include outside bevels located in tips of all teeth except for the partially cutoff teeth.

Another embodiment of a bicycle chain ring may further include an outside taper in each tooth immediately adjacent to and in a clockwise direction from a partially cutoff tooth when viewing an inside surface of the bicycle chain ring, see FIGS. 5 and 8 and related discussion, below. Still another embodiment of a bicycle chain ring may further include angled knife edges in each non-partially cutoff tooth when viewed from an edge of the bicycle chain ring looking down onto tips of the non-partially cutoff teeth, wherein the angled knife edges are not parallel to a plane running through the bicycle chain ring, see FIG. 3 and related discussion below. In yet another embodiment of a bicycle chain ring, a channel may be formed in the inside surface of the bicycle chain ring between adjacent ramps.

Embodiments of bicycle chain rings according to the present invention may have any suitable number of teeth, but more particularly in the range from 30 to 54 teeth. Embodiments of bicycle chain rings according to the present invention may have four or five support structures each having a mounting hole configured for attachment to a crank arm spider.

Embodiments of bicycle chain rings according to the present invention may include ramp structural width ranging from about 2 mm to about 30 mm. Ramp structural width may be measured in parallel to an inside surface of the bicycle chain ring and perpendicular to a lifting surface of the ramp. Embodiments of bicycle chain rings according to the present invention may include ramp structural thickness ranging from about 2 mm to about 5 mm. Ramp structural thickness may be measured perpendicular from the inside surface of the bicycle chain ring to the top surface of a ramp.

Figure 1:
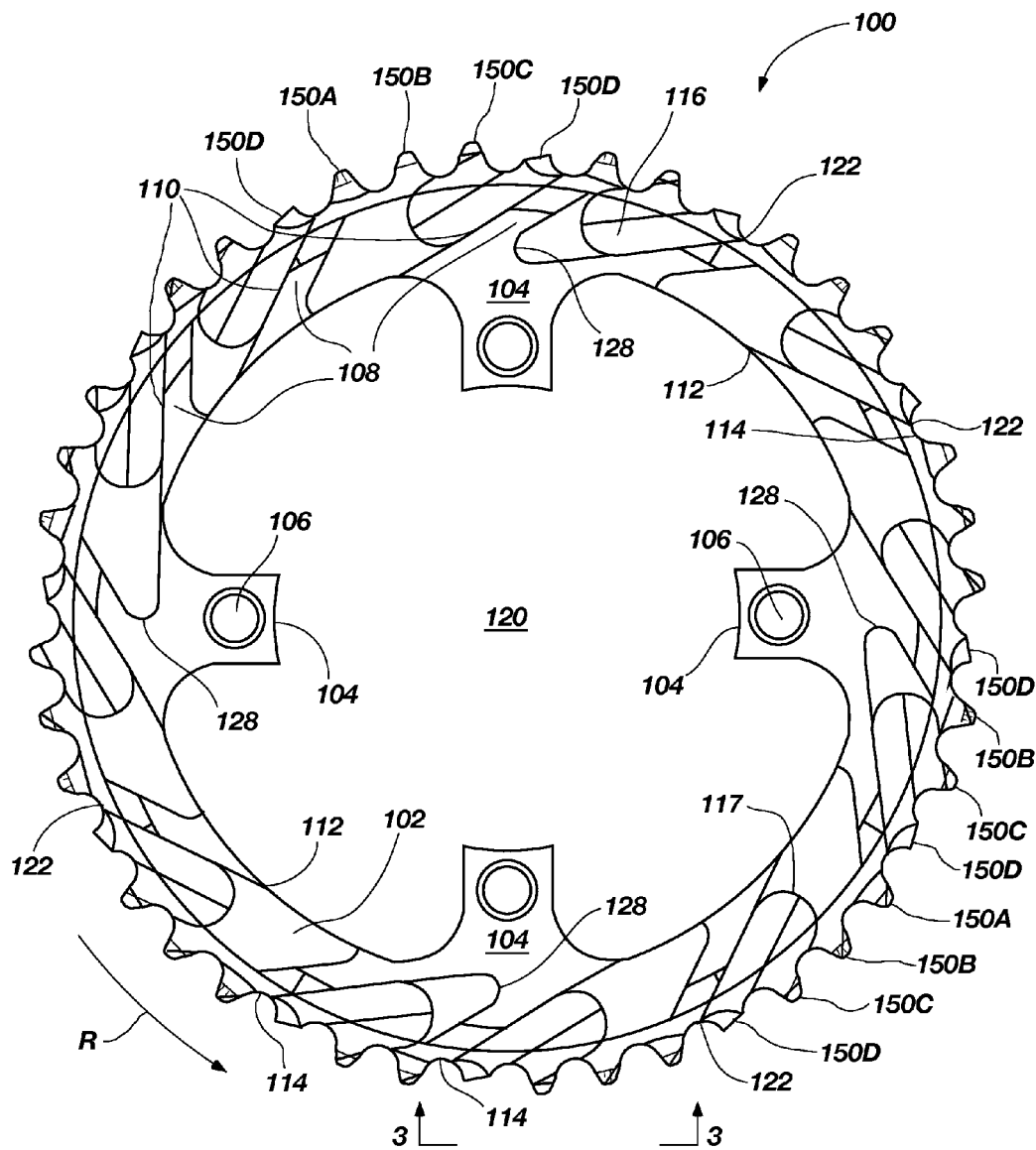
FIG. 1 is a plan view of an inner surface of a bicycle chain ring according to an embodiment of the present invention.

FIG. 1 is a plan view of an inner surface of a bicycle chain ring 100 according to an embodiment of the present invention. The bicycle chain ring 100 may include a circular structural member 102 having a plurality of contoured teeth 150A-D replicated serially in a clockwise manner about a circumference of the circular structural member 102. The bicycle chain ring 100 may further include a plurality of ramps 108 that are raised up from, and regularly disposed about, the inner surface of circular structural member 102.

Each of the plurality of ramps 108 may be configured with a lifting surface 110 to engage a plurality of outer chain links of a bicycle chain (not shown) to aid in lifting the bicycle chain from a smaller chain ring (also not shown) that is concentric but displaced away from the inner surface of bicycle chain ring 100. Each lifting surface 110 of each ramp 108 may run generally from a periphery 112 of an inner opening 120 to an outer end 122 near the base of a partially cutoff tooth 150D as shown in the illustrated embodiment of bicycle chain ring 100. However, lifting surfaces 110 need not extend all the way to the periphery 112 of inner opening 120, for example, see ramp starts 128.

According to an embodiment of the present invention, lifting surfaces 110 may be linear in profile as shown in FIG. 1. Alternatively according to another embodiment of bicycle chain ring 400 of the present invention, at least one of the lifting surfaces may be multi-linear in profile (e.g., see 410 in FIG. 4). According to still another embodiment of bicycle chain ring 100 of the present invention, at least one of the lifting surfaces 110 may be arcuate or curved in profile, not shown in FIGS.

According to an embodiment of a bicycle chain ring 100 shown in FIG. 1, each of the plurality of ramps 108 may begin near a support structure 104 or at a periphery of an inner opening 112 of the circular structural member 102. Each of the plurality of ramps 108 ends at a trough or recess 114 between teeth 150A and 150D. The thickness and width of the structure used to form the plurality of ramps 108 may be of any suitable dimension. Furthermore, any suitable material may be used to form the chain rings 100 according to embodiments of the present invention, for example and not by way of limitation, aluminum, titanium, steel, and carbon fiber.

According to another embodiment of the present invention, bicycle chain ring 100 may further include an inside taper 116 in the circular structural member 102 located above each of the plurality of ramps 108. The inside taper 116 may be achieved by any suitable means including, but not limited to machining, stamping or investment casting. The inside taper 116 may be linear in nature and reduce the thickness of the circular structural member 102 above each ramp 108 in any amount ranging from 0 mm to approximately 2 mm. The inside taper 116 may begin, for example, along the curved lines 117 and extend through teeth 150C and 150D to an outer end 122 where the taper is greatest. The inside taper 116 provides decreasing circular structural member 102 thickness in a direction opposite normal rotation, R, of the bicycle chain ring 100 during an up-shift. See FIG. 3 and related discussion below for further illustration of inside taper 116.

According to still another embodiment of the present invention, bicycle chain ring 100 may further include partially cutoff teeth 150D located radially above an outer end 122 of each of the plurality of ramps 108. Nonpartially cutoff teeth 150A-C may be found between the partially cutoff teeth 150D. Generally speaking, all teeth 150A-D shown in FIG. 1 are contoured or profiled to improve shifting characteristics as described herein.

Figure 2:
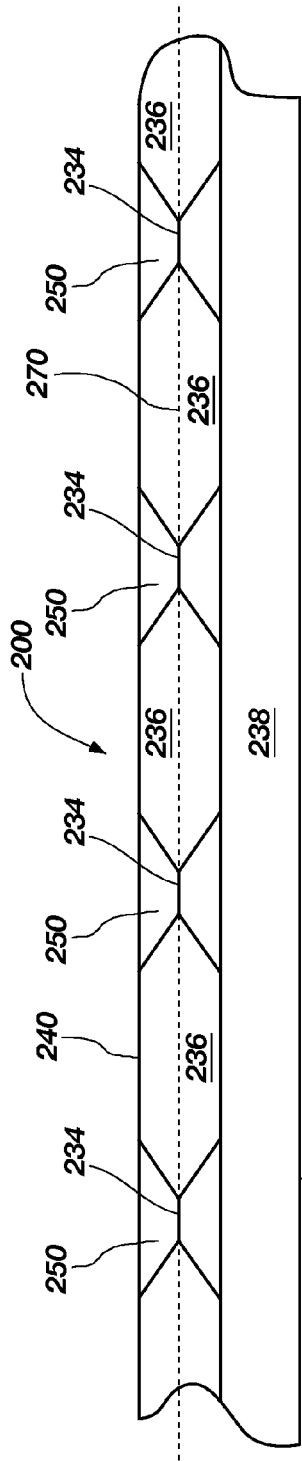
FIG. 2 is an edge view of a portion of a conventional bicycle chain ring viewed from above the teeth.

FIG. 2 is an edge view of a portion of a conventional bicycle chain ring, shown generally at 200, viewed from above the teeth 250. The relative dimensions of FIG. 2 are not drawn to scale, but are exaggerated for ease of explanation. A conventional bicycle chain ring 200 may have an inside surface 240 and an outside surface 242. A conventional bicycle chain ring 200 may have generally uniform shaped teeth 250 having knife edge points 234 separated by generally uniformly rounded troughs 236 that support round bushings (not shown) of a bicycle chain (not shown). Conventional bicycle chain rings 200 may also have an outer ridge 238 and/or an inner ridge (not shown) for structural support. FIG. 2 also illustrates a center plane 270 (see dotted line) that is coplanar with knife edge points 234.

Figure 3:
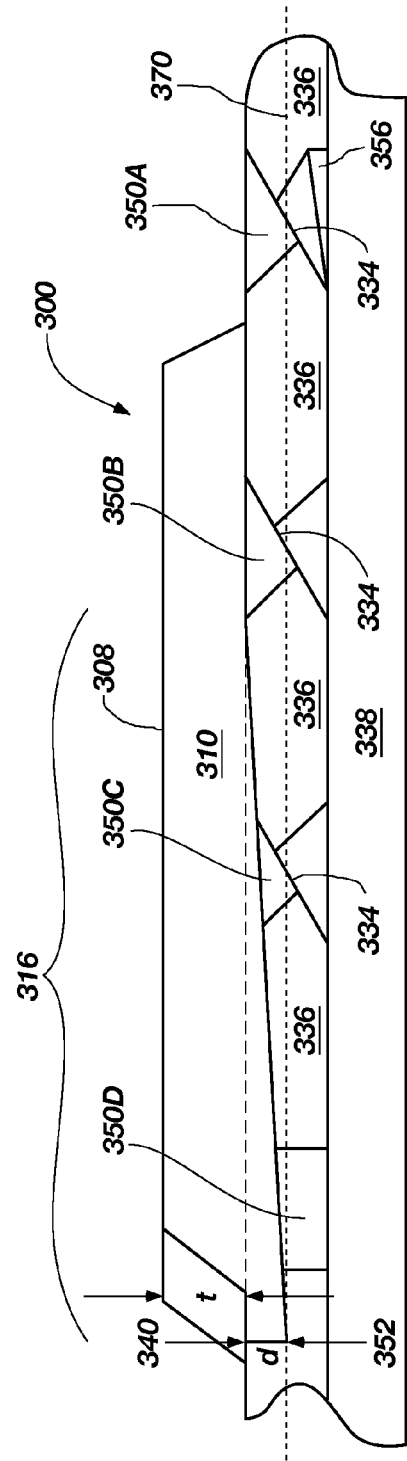
FIG. 3 is an edge view of a portion of an embodiment of a bicycle chain ring according to the present invention.

In contrast, FIG. 3 is an edge view of a portion of an embodiment of a bicycle chain ring 300 according to the present invention (as indicated on FIG. 1 by bent arrows 3). As with FIG. 2, the relative dimensions of FIG. 3 are not drawn to scale, but are exaggerated for ease of explanation. The view of a portion of bicycle chain ring 300 shown in FIG. 3 illustrates a top view of four adjacent contoured teeth 350A-D. Bicycle chain ring 300 may also have an outer ridge 338, according to the embodiment shown in FIG. 3. Bicycle chain ring 300 may further include rounded troughs 336 for supporting cylindrical bushings (not shown) of a bicycle chain (not shown) in between each of the contoured teeth 350A-D. However, the surfaces of rounded troughs 336 are not uniform like the rounded troughs 236 of the conventional bicycle chain ring 200 (FIG. 2) because of the additional novel features of the contoured teeth 350A-D.

The portion of an embodiment of a bicycle chain ring 300 illustrates a ramp 308 having a lifting surface 310 for engaging a bicycle chain (not shown) during up-shifts. The ramp 308 with lifting surface 310 is a unique feature that is completely missing from conventional bicycle chain ring 200. While some conventional bicycle chain rings have pins, they still do not have ramps 308 with extended lifting surfaces for engaging multiple links of a bicycle chain. The pins associated with some conventional bicycle chain rings only engage a single chain ring link. However, the inside lifting surfaces 110 and 310 of ramps 108 and 308 of the embodiments of bicycle chain rings 100 and 300 of the present invention are capable of supporting a plurality of bicycle chain links. This feature of embodiments of the present invention provides better support to lift a bicycle chain during up-shifts. This feature is especially important during hard up-shifts, for example when sprinting or when the rider is out of the saddle during climbing, thereby putting substantial tensile force on the chain.

The lifting surface 310 on ramp 308 is expanded (below the dashed line in FIG. 3) along inside taper 316 (shown generally below bracket in FIG. 3). The inside taper 316 is formed in the inside of bicycle chain ring 300. The inside taper 316 narrows the overall thickness of the teeth 350A-D and troughs (saddles) 336 by a distance, d, defined by a distance measured from inside surface 340 (shown in part by dashed line in FIG. 3) to the deepest chamfer cut point 352. That inside taper distance, d, may be any amount up to about 2 mm according to various embodiments of bicycle chain ring 300.

Another feature of bicycle chain ring 300 is the angled knife edges 334 of teeth 350A-C. FIG. 3 illustrates a center plane 370 (see dotted line) that clearly shows that the angled knife edges 334 are noncoplanar, i.e., angled knife edges 334 do not fall along the center line 370, but are angled to it. The angling of the knife edges 334 of teeth 350A-C provides enhanced bicycle chain meshing during an up-shift because the bicycle chain twists during an up-shift from a smaller to larger chain ring. Note that the angling of the knife edges 334 shown in FIG. 3 are exaggerated for ease of explanation and may not actually be angled as greatly as illustrated. The angling of the knife edges 334 tracks the twisting of the bicycle chain to more quickly engage the bicycle chain than without the angled knife edges 334. This feature improves up-shifting performance (faster) relative to knife edges points 234 (see FIG. 2) having no angling. This feature may also improve chain meshing when the bicycle chain is being driven at an angle relative to rear cogs associated with a freewheel or cassette mechanism. Poor chain meshing is characterized by lack of consistent seating of the bicycle chain in troughs 236 and may be caused by the bicycle chain being driven at an angle relative to rear cogs. Poor chain meshing may also be characterized by increased noise resulting from the lack of consistent seating of the bicycle chain and its cylindrical bushings in troughs 236.

Still another feature illustrated in FIG. 3 is outside taper 356 in contoured tooth 350A. Outside taper 356 works in conjunction with a ramp to the right of tooth 350A (not shown) to narrow the thickness of contoured tooth 350A and thereby making it easier for tooth 350A to grab the bicycle chain ring 300 during an up-shift. According to another embodiment, outside taper 356 may be a short bevel or chamfer along the outside edge of tooth 350A rather than the taper along the entire width of tooth 350A shown in FIG. 3. Note that four contoured teeth 350A-D are shown associated with the ramp 308, in FIG. 3. However, any number of teeth, three to seven may be associated with each ramp according to other embodiments of the present invention. In those other instances, the tooth having an outside taper would be to the left of cutoff tooth 350D in the view of FIG. 3. For example, see outside taper 556 in FIG. 5 and related discussion below.

Structural thickness, t, of ramps 308 may range from about 2 mm to about 5 mm according to embodiments of the present invention. Structural thickness, t, less than about 2 mm may not provide enough lifting surface along the ramp 308 for efficient up-shifting. Structural thickness, t, greater than about 5 mm may cause the bicycle chain to unnecessarily catch when the chain is tracking in smaller chain rings and angled in toward the larger chain ring because of rear cog alignment.

Referring to FIGS. 1 and 3, partially cutoff teeth 150D and 350D do not have a knife edge 334 because the upper portion of teeth 150D and 350D have been removed. The purpose for reducing the profile of teeth 150D and 350D by partially cutting off the upper portion of teeth 150D and 350D is to provide a point of lateral entry of the bicycle chain over the bicycle chain ring 100 and 300 during an up-shift. Thus, the partially cutoff teeth 150D and 350D encourage lateral movement of the bicycle chain from a small bicycle chain ring onto bicycle chain rings 100 and 300. This encouraging of lateral movement improves shifting performance over conventional bicycle chain rings such as the one illustrated in FIG. 2, where all of the teeth 250 are of identical height profile. Incidentally, the partially cutoff teeth 150D and 350D also improve down-shifting for essentially the same reason: encouraging lateral movement of the bicycle chain. However, during a down-shift, the bicycle chain is urged off of bicycle chain ring 300.

Embodiments of bicycle chain rings 100 and 300 illustrated in FIGS. 1 and 3 may have three contoured teeth 150B-D and 350B-D or four contoured teeth 150A-D and 350A-D associated with each ramp 108 and 308. However, other combinations and numbers of contoured teeth 150A-D and 350A-D may be associated with ramps 108 and 308 consistent with the present invention. Such other combinations and numbers of contoured teeth are considered to be within the spirit and scope of the present invention.

Figure 4:
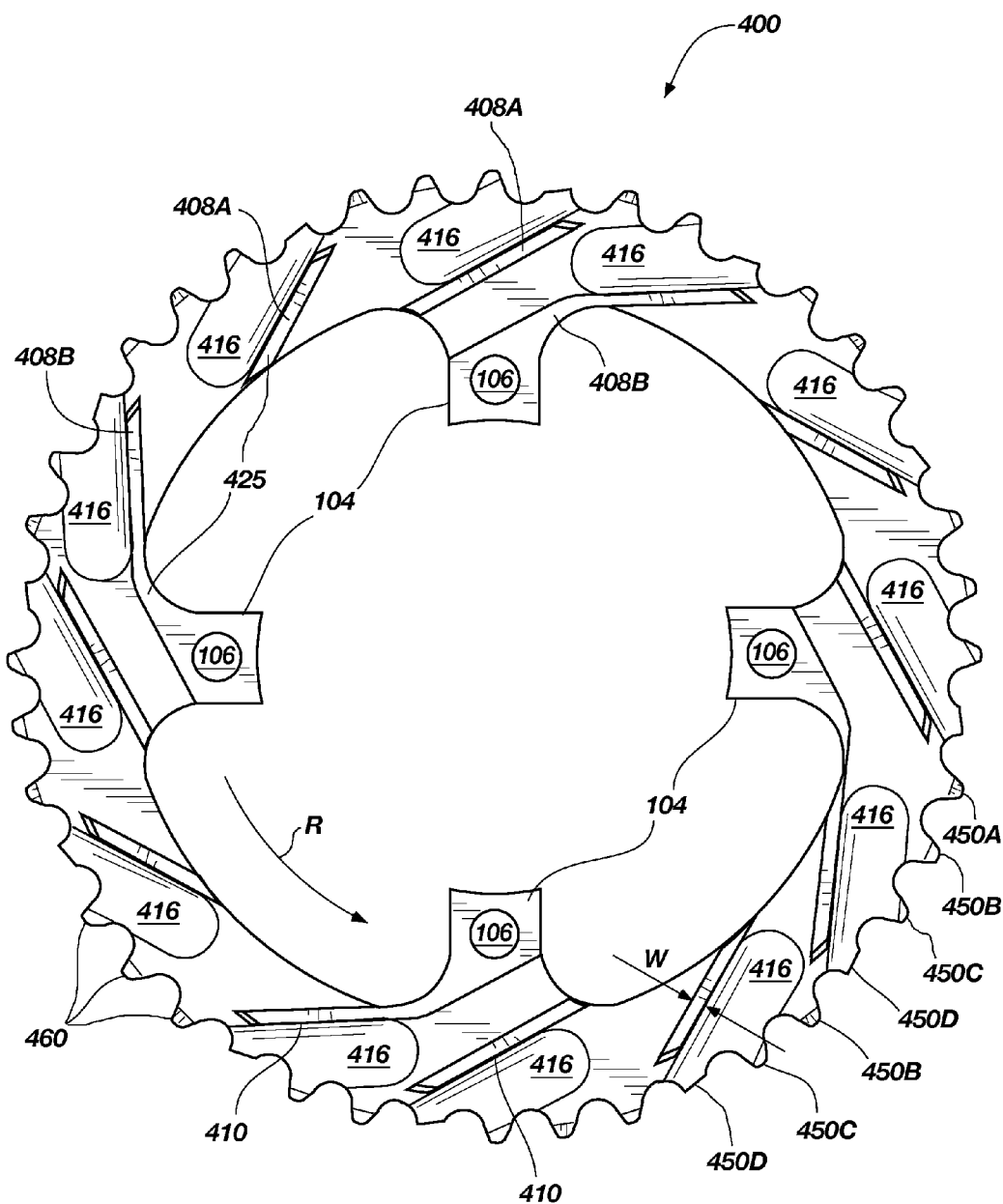
FIG. 4 is a plan view of the inside of another embodiment of a bicycle chain ring having 44 teeth configured for a standard 104 mm 4-bolt crankset according to the present invention.

FIG. 4 is a plan view of the inside of another embodiment of a bicycle chain ring 400 having 44 contoured teeth 450A-D configured for a standard 104 mm 4-bolt crankset according to the present invention. Bicycle chain ring 400 may be used as a large chain ring on a mountain bike crankset. It will be readily apparent to one of ordinary skill in the art that the invention is not limited to any particular mounting bolt pattern, mounting bolt number, number of teeth or bolt pattern radius.

Contoured teeth 450A-D may include inside bevels 460 along the tips to achieve the angled knife edges (334 in FIG. 3) as a feature of the present invention. Inside bevels 460 form portions of the angled knife edges (334 in FIG. 3) that improve bicycle chain meshing as described herein. Inside bevels 460 may be of any shape that improves bicycle chain meshing and therefore reduces noise and improves shifting performance relative to bicycle chain rings without such features.

According to the embodiment of bicycle chain ring 400, ramps 408 may be linear profile ramps 408A or bilinear profile ramps 408B. The bilinear profile ramps 408B may be partially formed on support structures 104, thus allowing for longer ramps and bilinear configurations. Ramps 408A-B may include gaps (not shown) according to other embodiments of bicycle chain ring 400, but each ramp 408A-B always supports more than a single link as distinguished from pins used in prior art chain rings. FIG. 4 also illustrates structural members 104 (four shown) and their associated mounting holes 106.

FIG. 4 also illustrates the regions of inside taper 416 adjacent the lifting surface 410 of each ramp 408A-B. Inside taper 416 may take any form or shape that narrows the thickness of the bicycle chain ring 400 above the ramps 408A-B according to various embodiments of the present invention. See also FIG. 6 and related discussion below for an enlarged view of inside taper 416. The structural width, w, of any given ramp 408A-B may be of any suitable dimension that provides consistent support of a bicycle chain. Any structural width, w, less than about 2 mm, may lack suitable wear characteristics for use on bicycles over extended periods of time. Structural width, w, may vary from among the ramps 408 located on a single bicycle chain ring 400 according to other embodiments of the present invention, e.g., see FIGS. 7 and 9, below. Structural width, w, may fall within the range from about 2 mm to about 30 mm according to various embodiments of the present invention.

Figure 5:
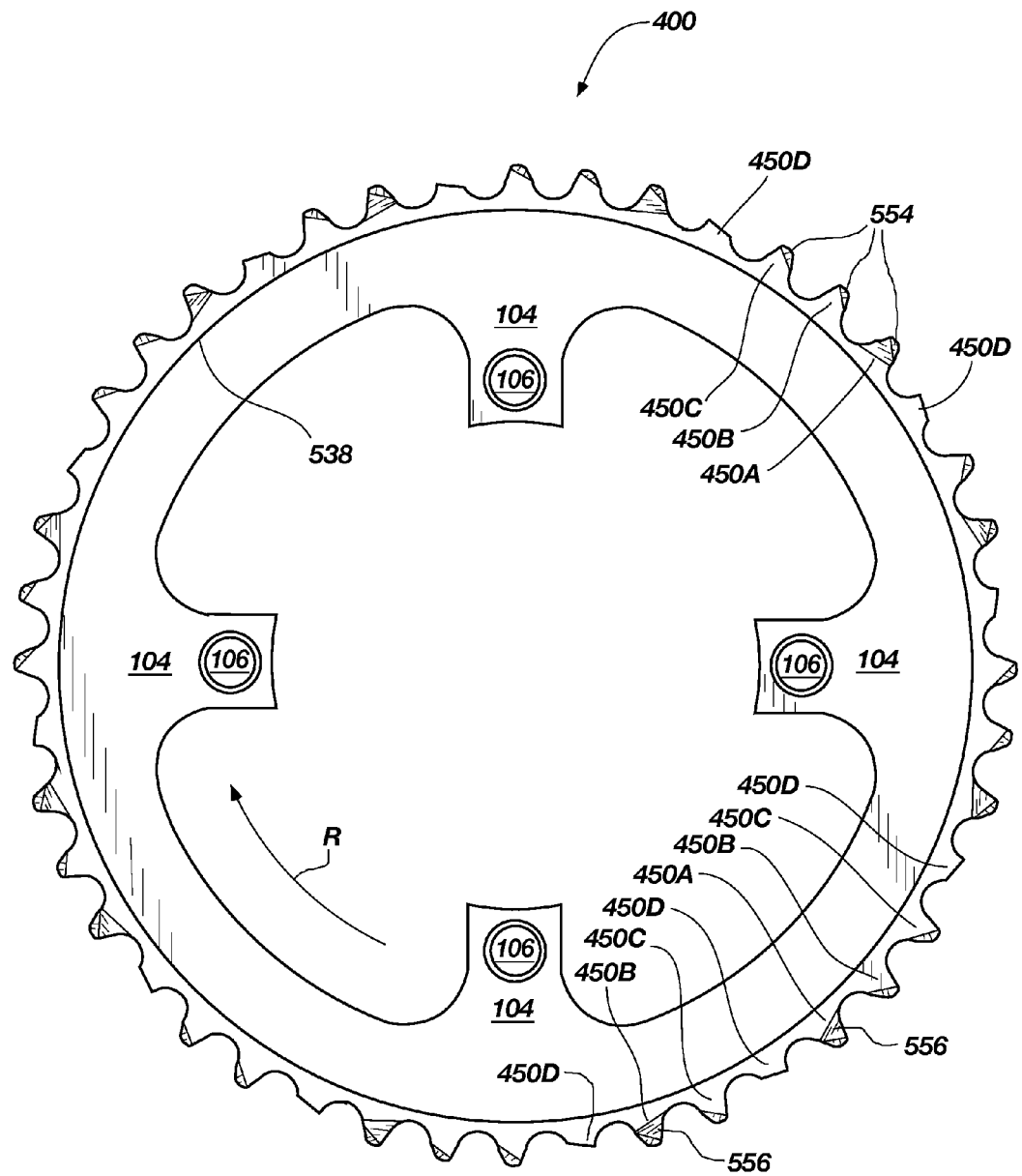
FIG. 5 is a plan view of the outside of the embodiment of the bicycle chain ring shown in FIG. 4.

FIG. 5 is a plan view of the outside of the embodiment of the bicycle chain ring 400 shown in FIG. 4. In the view of FIG. 5, outer ridge 538 appears as a circle underneath contoured teeth 450A-D. FIG. 5 also illustrates structural members 104 (four shown) and their associated mounting holes 106. FIG. 5 further illustrates the outside bevel 554 of contoured teeth 450, particularly contoured teeth 450A-C and not including partially cutoff teeth 450D (i.e., all teeth other than cutoff teeth 450D). Outside bevel 554 provides enhanced bicycle chain meshing as described above. Another feature of bicycle chain ring 400 illustrated in FIG. 5 is outside taper 556. Outside taper 556 is associated with contoured teeth 450A or 450B, depending on the number of contoured teeth (three or four) associated with a given ramp 408. Outside taper 556 narrows contoured teeth 450A or 450B at a position adjacent to cutoff teeth 450D. The outside taper 556 is configured to grab the inside of a bicycle chain link between cylindrical bushings. Thus, outside taper 556 can more quickly grab the bicycle chain (not shown) during an up-shift because the profile of contoured teeth 450A or 450B is narrower. Outside taper 556 may also improve chain meshing as described above. Embodiments of outside taper 556 may encompass most of the body of contoured teeth 450A or 450B as shown in bicycle chain ring 400 of FIG. 5. Alternatively, outside taper 556 may be a smaller chamfer, bevel or notch (not shown in FIG. 5, but see FIG. 8 and outside notch 856) on the body of contoured teeth 450A or 450B nearest contoured teeth 450D according to other embodiments of the present invention.

Figure 6:
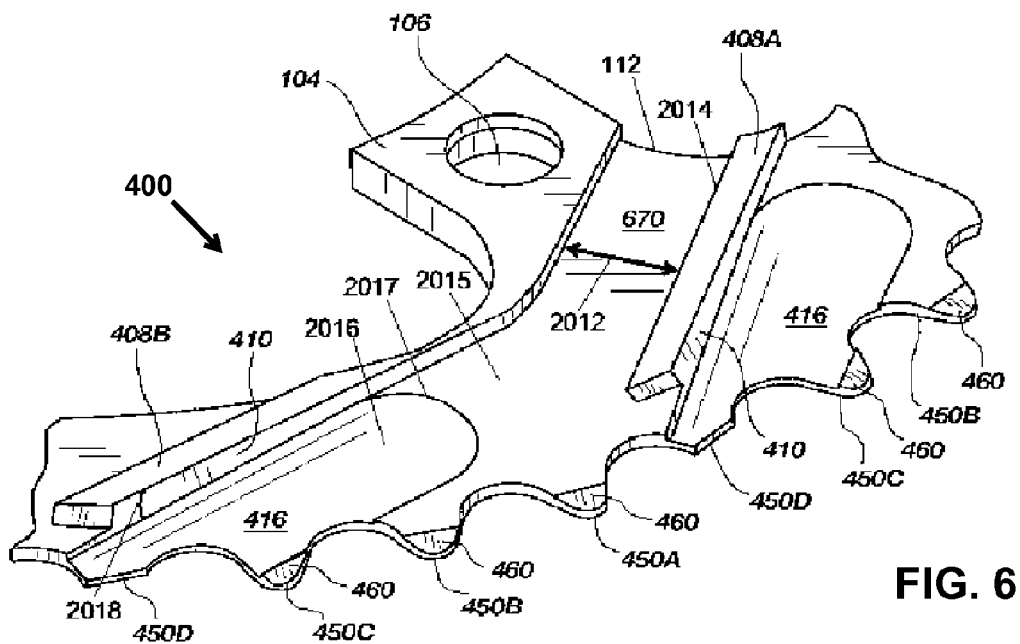
FIG. 6 is an enlarged perspective view of a portion of the inside of the bicycle chain ring shown in FIG. 4.
Figure 6A:
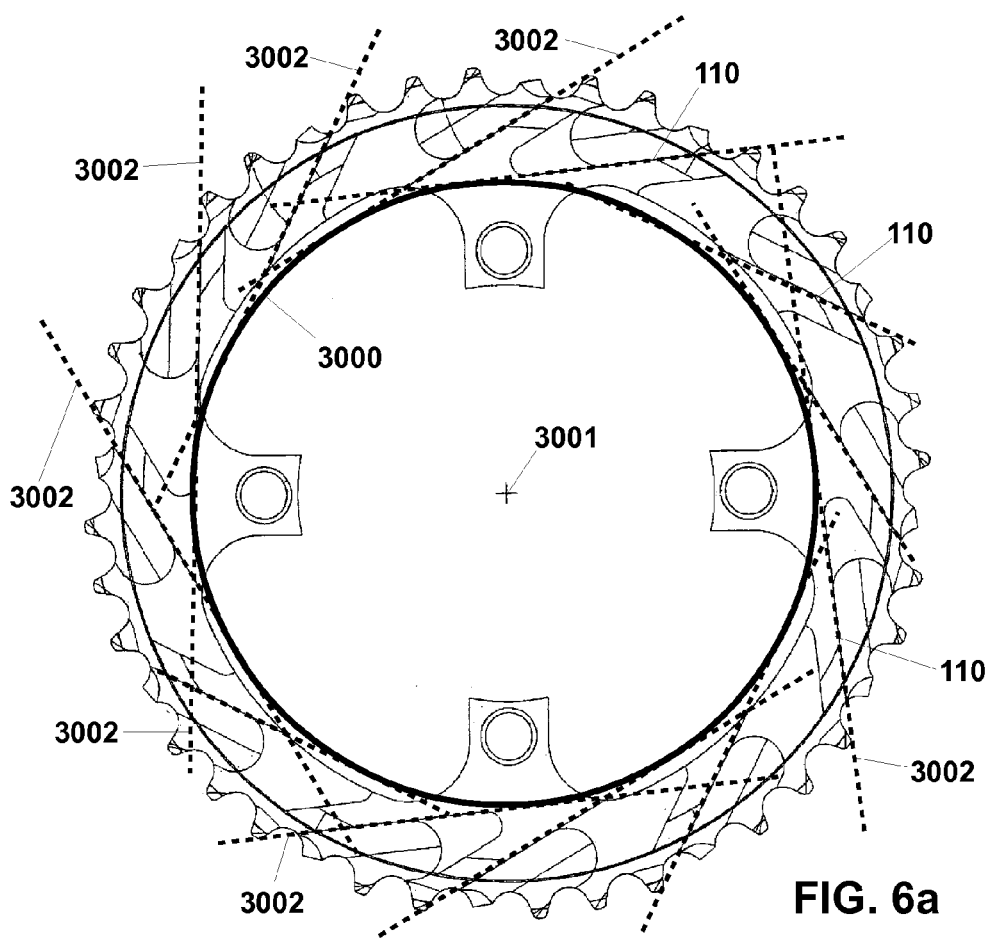
FIG. 6a shows the chain ring of FIG. 1 overlaid with a geometric circle and its tangents.

FIG. 6 is a perspective view of a portion of the inside of the bicycle chain ring 400 shown in FIG. 4, enlarged to show detail. The portion of the bicycle chain ring 400 shown in FIG. 6 includes two ramps 408, more specifically a linear profile ramp 408A and a bilinear profiled ramp 408B. FIG. 6 also illustrates a support structure 104, a mounting hole 106, a lifting surface 410 on each ramp 408A-B, contoured teeth 450A-D, inside bevels 460 associated with contoured teeth 450A-C and inside taper 416 adjacent ramps 408A-B. FIG. 6 further illustrates a channel 670 on the ramp face (1310, see FIG. 32A) that is formed between adjacent ramps 408A-B on the inside surface of bicycle chain ring 400 according to the present invention. Channel 670 provides a space for the bicycle chain during up-shifts. The ramp face includes a first planar portion 2015 connecting to a second planar portion 2016 at a transition 2017. The height 2018 of the ramp 410 adjacent to the second planar portion 2016 is greater than the height 2018 of the ramp 410 adjacent to the first planar portion 2015. The channel 670 is bounded by the ramp 408A, the periphery 112, and the side 2014 of a closest element (ramp 408A in the illustrated example) extending from the first planar portion 2015. The side 2014 and the ramp 408A extend outwardly from the first planar portion 2015 in generally the same direction away from the center plane of the chainring. The first planar portion 2015 and the channel 670 both have a width 2012 between the ramp 408B and the side 2014 of ramp 408A. FIG. 6a shows the chain ring of FIG. 1 overlaid with a geometric circle 3000 having a center 3001 located at the axis of rotation of the chain ring and a plurality of geometric tangents 3002. As shown in FIG. 6a, each of the lifting surface 110 of the chain ring is aligned with one of the tangents 3002 of the geometric circle 3000.

Figure 7:
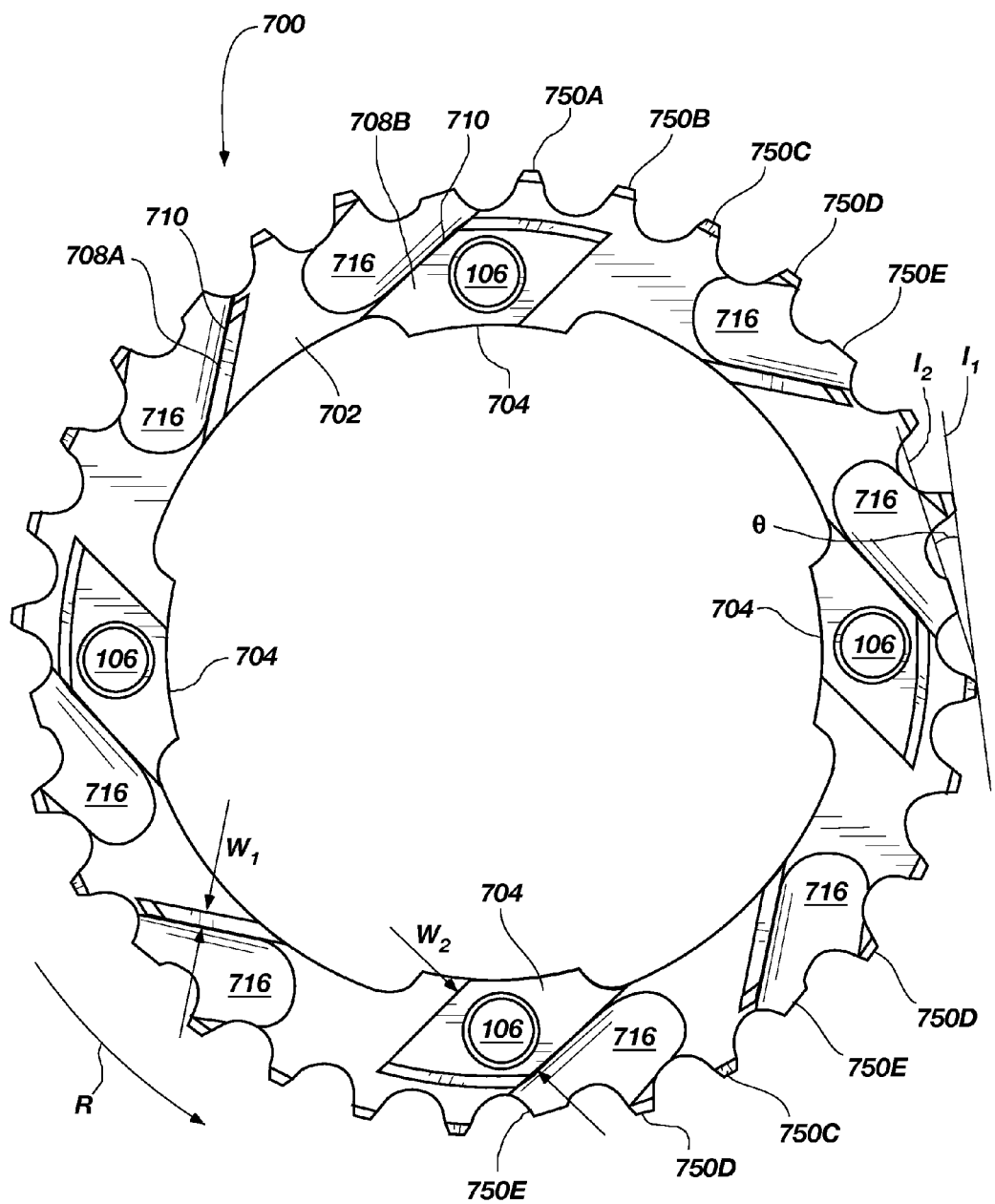
FIG. 7 is a plan view of the inside of yet another embodiment of a bicycle chain ring having 32 contoured teeth configured for a standard 104 mm 4-bolt crankset according to the present invention.

FIG. 7 is a plan view of the inside of yet another embodiment of a bicycle chain ring 700 having 32 contoured teeth 750A-D configured for a standard 104 mm 4-bolt crankset according to the present invention. Bicycle chain ring 700 may be configured as a middle chain ring on a mountain bike crankset. Bicycle chain rings 400 and 700 together may form a compact set of chain rings for a mountain bike crankset. Bicycle chain ring 700 may include a circular structural member 702, a plurality of support structures 704 (four shown), each with mounting holes 106 (four shown). Bicycle chain ring 700 may further include ramps 708A-B (eight total: four ramps 708A and four ramps 708B) of various widths, w, depending on the location of the ramp 708A-B. For example and not by way of limitation, ramp 708A may include relatively narrow width, $w_1$. Whereas ramp 708B may have a relatively wide width, $w_2$, that encompasses mounting hole 106, as shown in FIG. 7. As noted above, ramp structural width, w, $w_1$ or $w_2$, may be anywhere in the range from about 2 mm to about 30 mm. Structural thickness (not shown in FIG. 7) of ramps 708A-B may be as described above for the embodiment of bicycle chain ring 300 in FIG. 3.

Referring again to FIG. 7, each ramp 708A-B is configured with a lifting surface 710. Each ramp 708A-B may be associated with three or five contoured teeth 750A-E depending on the size and location of the associated ramp 708A-B. Partially cutoff teeth 750E are separated by nonpartially cutoff, contoured teeth 750A-D. Of course, contoured teeth 750A-E shown in the embodiment of FIG. 7, may have similar features and characteristics to contoured teeth 150A-D, 350A-D and 450A-D, as other embodiments described above. Bicycle chain ring 700 may further have inside tapers 716 adjacent the lifting surfaces 710 of each ramp 708A-B. Inside tapers 716 may have similar features and characteristics to inside tapers 116 (FIG. 1) and 316 (FIG. 3) described above. FIG. 7 also illustrates support structures 704 and associated mounting holes 106.

Figure 8:
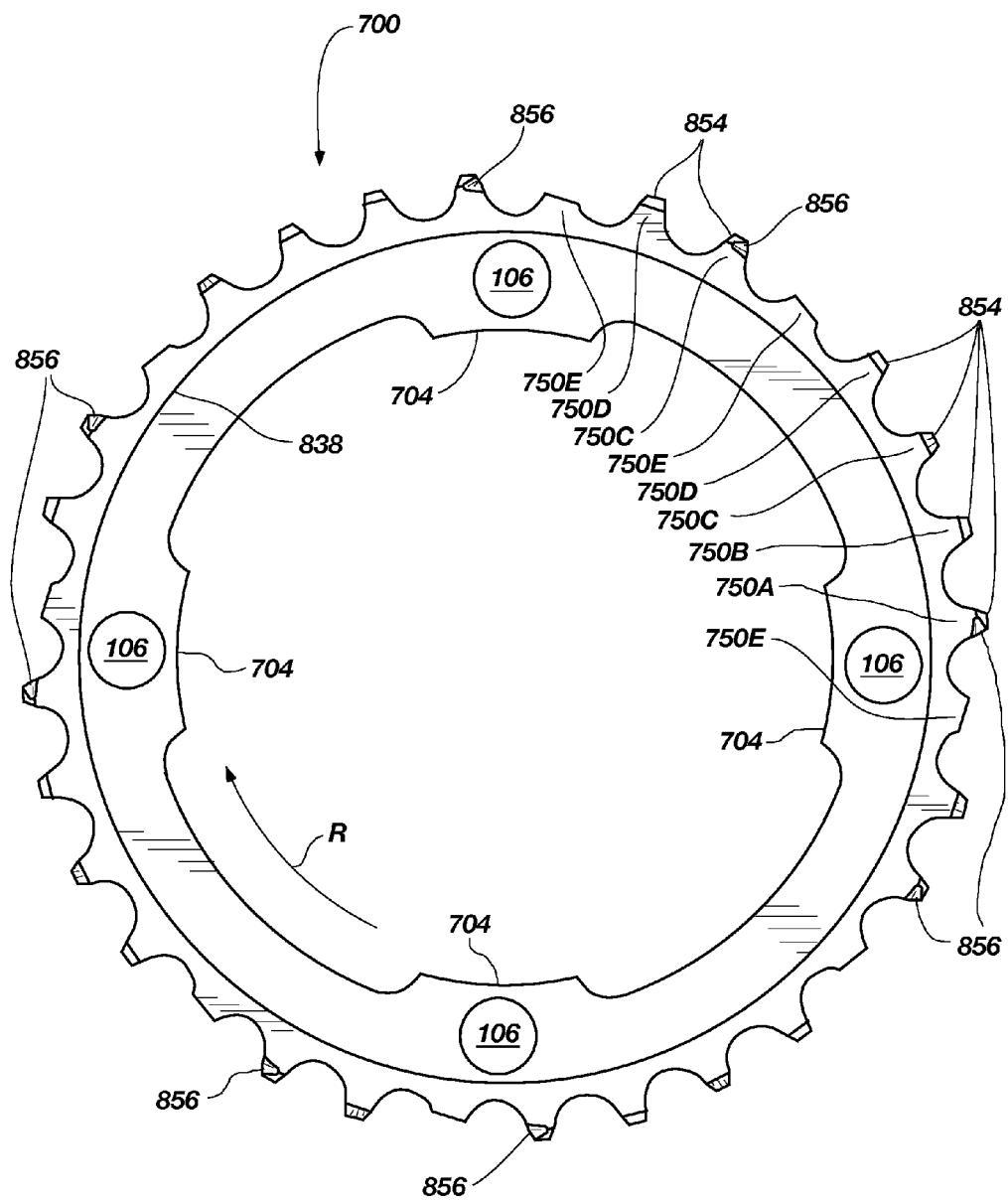
FIG. 8 is a plan view of the outside of the embodiment of the bicycle chain ring shown in FIG. 7.

FIG. 8 is a plan view of the outside of the embodiment of the bicycle chain ring 700 shown in FIG. 7. In the view of FIG. 8, outer ridge 838 appears as a circle underneath contoured teeth 750A-E. FIG. 8 also illustrates the outside bevel 854 of contoured teeth 750, particularly contoured teeth 750A-D and not including partially cutoff teeth 750E (i.e., all teeth other than cutoff teeth 750E). Outside bevel 854 provides enhanced bicycle chain meshing as described above. FIG. 8 also illustrates outside notch 856. Outside notch 856 is associated with contoured teeth 750A or 750C depending on the number of contoured teeth (three or five) associated with a given ramp 708 (not shown in FIG. 8). Outside notch 856 narrows contoured teeth 750A or 750C at a position adjacent to cutoff teeth 750E. The outside notch 856 is configured to grab the inside of a bicycle chain link between cylindrical bushings (not shown) in the chain (also not shown). Thus, outside notch 856 can more quickly engage the bicycle chain (not shown) during an up-shift, because the profile of contoured teeth 750A or 750C is narrower. Outside notch 856 may also improve chain meshing as described above. Other embodiments of outside notch 856 may encompass most of the body of contoured teeth 750A or 750C as shown in outside taper 556 of bicycle chain ring 400 of FIG. 5. FIG. 8 also illustrates support structures 704 and associated mounting holes 106.

Figure 9:
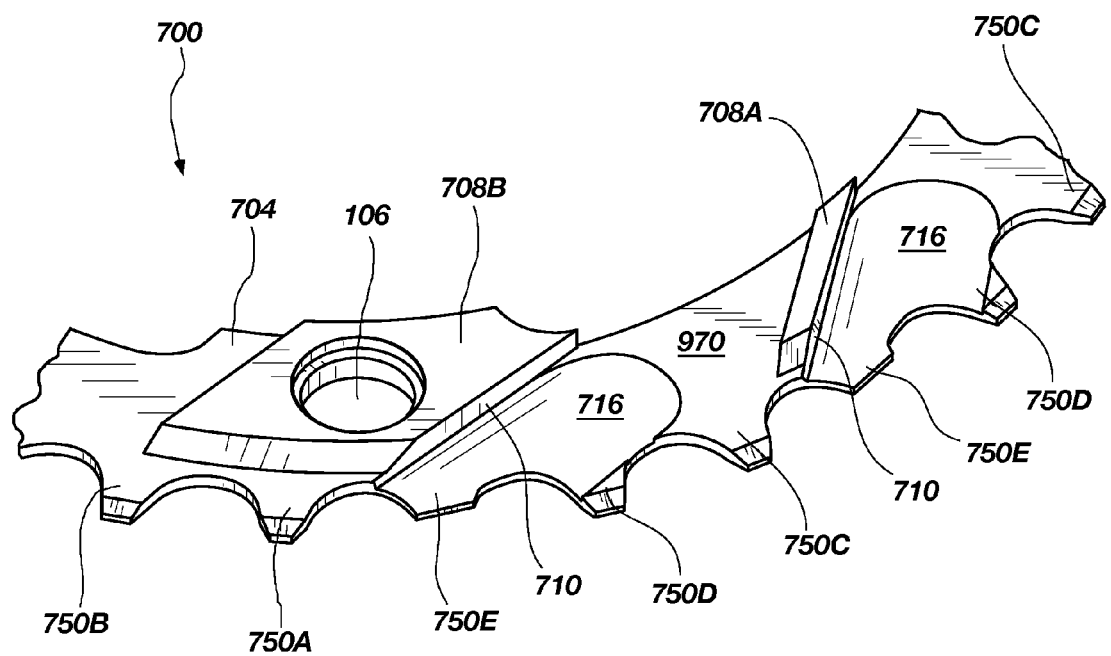
FIG. 9 is an enlarged perspective view of a portion of the inside of the bicycle chain ring shown in FIG. 7.

Referring now to FIG. 9, a perspective view of a portion of the inside of the bicycle chain ring 700 of FIG. 7 is enlarged to show detail. The portion of the bicycle chain ring 700 shown in FIG. 9 includes two linear ramps 708A-B, more specifically a narrow width ($w_1$) linear profile ramp 708A and a wide width ($w_2$) linear profiled ramp 708B (see also FIG. 7). FIG. 9 also illustrates a support structure 704, a mounting hole 106, a lifting surface 710 on each ramp 708A-B, contoured teeth 750A-E and inside taper 716 adjacent ramps 708A-B. FIG. 9 further illustrates a channel 970 that is formed between adjacent ramps 708A-B on the inside surface of bicycle chain ring 700 according to the present invention. Channel 970 provides a space for the bicycle chain during up-shifts.

Referring generally to FIGS. 1 and 3-7, embodiments of bicycle chain rings, 100, 300, 400 and 700 include between two and five nonpartially cutoff, contoured teeth 150A-C, 350A-C, 450A-C and 750A-D (see FIG. 11 below for an example of five nonpartially cutoff teeth) separating any two nearest cutoff teeth 150D, 350D, 450D and 750E. The centers of mounting holes 106 may be on the circumference of a circle 104 mm in diameter according to a particular embodiment of the bicycle chain rings of the present invention. According to alternative embodiments, centers of mounting holes 106 may be on the circumference of a circle 94 mm or 110 mm in diameter. The bicycle chain rings 100, 300, 400 and 700 disclosed herein may be configured for compatibility with any commercially available crankset, for example and not by way of limitation, cranksets manufactured by Shimano™, Campagnolo™, Race Face™, Truvative™, Richey™, Nashbar™, FSA™, and any other manufacturer or model of crankset.

Yet another feature of the partially cutoff teeth 150D, 350D, 450D and 750E disclosed herein is the angle, θ, at which such teeth are cutoff. Referring specifically to FIG. 7, note that angle, θ, is shown as measured from tangential line, $l_1$, to angled line, $l_2$, traced through the top of partially cutoff teeth 750E. By partially cutting off teeth 750E at angle, θ, the bicycle chain is given the clearance it needs during a down-shift to be able to move laterally past the partially cutoff tooth 750E and drop off chain ring 700 to engage the next smaller chain ring (not shown). During a down-shift, the partially cutoff tooth 750E allows an entire chain link to move laterally towards the inside of bicycle chain ring 700 and past the partially cutoff tooth 750E without making contact with tooth 750E. This feature promotes faster down-shifts. The angled (θ) cutoff teeth 750E are preferred over tangentially cutoff teeth of the prior art (see e.g., U.S. Pat. No. 5,078,653 to Nagano as discussed above in the background) because the bicycle chain comes off of chain ring 700 at an angle approximated by angle, θ, not tangentially, during a down-shift.

Figure 10:
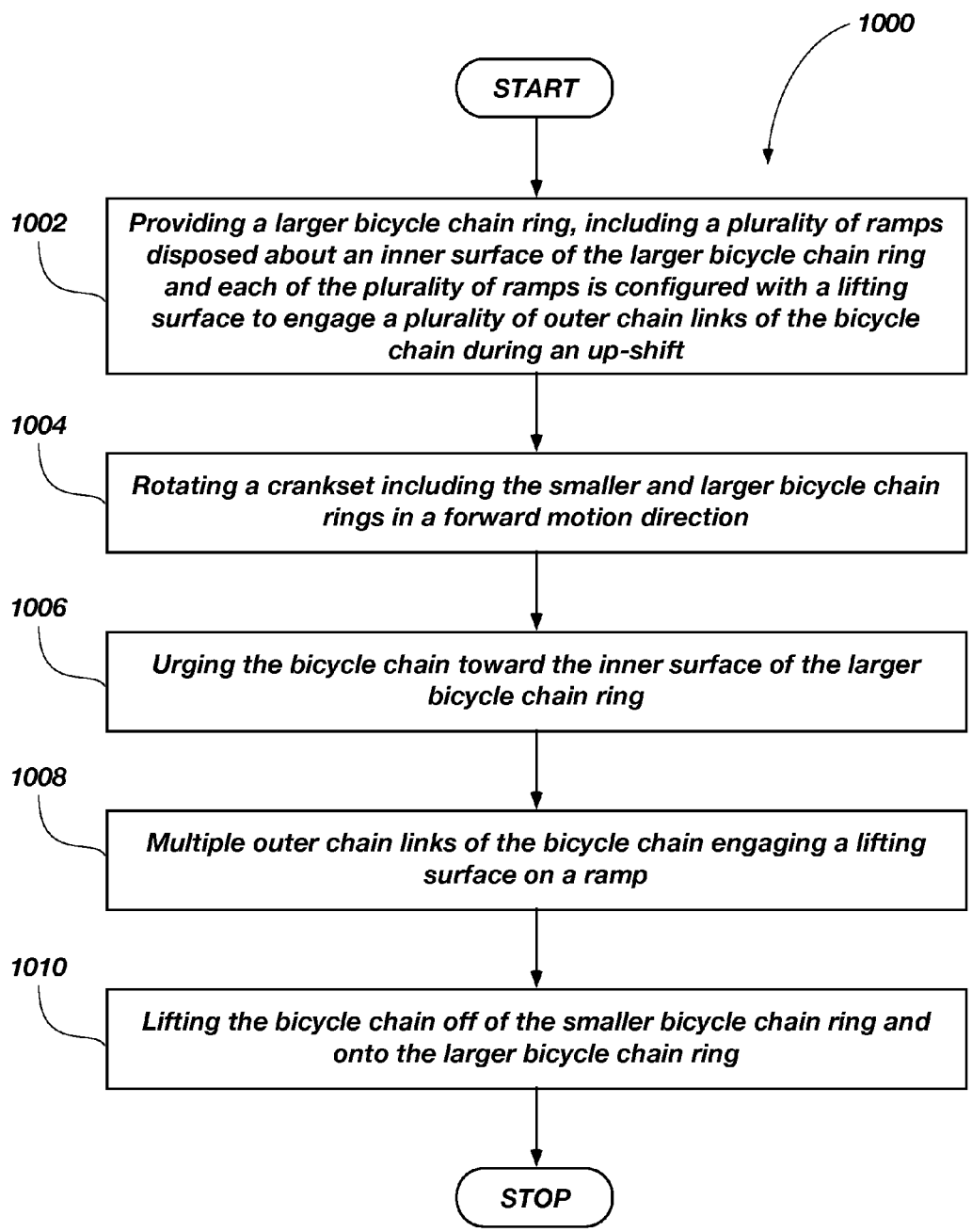
FIG. 10 is a flow chart of an embodiment of a method for up-shifting a bicycle chain from a smaller bicycle chain ring to a larger bicycle chain ring.

FIG. 10 is a flow chart of an embodiment of a method 1000 for up-shifting a bicycle chain from a smaller bicycle chain ring to a larger bicycle chain ring. Method 1000 may include providing 1002 a larger bicycle chain ring as described herein. Method 1000 may further include rotating 1004 a crankset including the smaller and larger bicycle chain rings in a forward motion direction. Method 1000 may further include urging 1006 the bicycle chain toward the inner surface of the larger bicycle chain ring. This urging 1006 may be achieved by activating a front derailleur having a chain guide that pushes laterally against the sides of a bicycle chain. Alternatively, urging 1006 may be achieved by activating a front derailleur such as those described in U.S. Pat. No. 6,454,671 and U.S. Published Patent Application No. US20020177498, both to the present inventor, Christopher A. Wickliffe, thereby lifting a lower outside corner of a bicycle chain toward the larger bicycle chain ring. Method 1000 may further include multiple outer chain links of the bicycle chain engaging 1008 a lifting surface on a ramp and lifting 1010 the bicycle chain off of the smaller bicycle chain ring and onto the larger bicycle chain ring.

Figure 11:
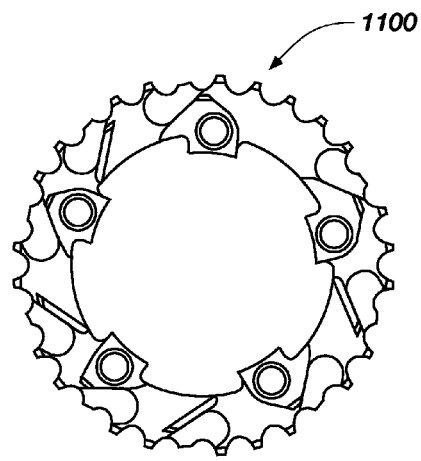
FIG. 11 is a plan view of the inside of a 32 tooth bicycle chain ring on 94 mm mounting bolt centers having five mounting bolt holes according to an embodiment of the present invention.
Figure 12:
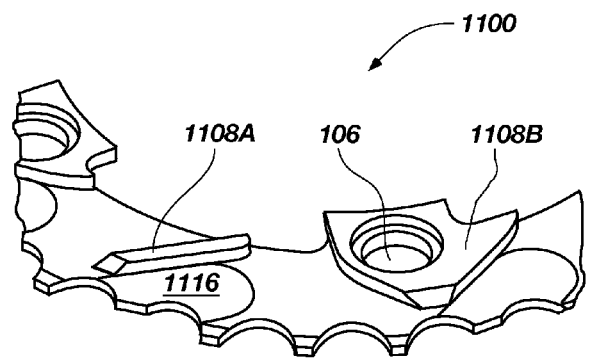
FIG. 12 is an enlarged perspective view of a portion of the inside of the bicycle chain ring shown in FIG. 11.
Figure 13:
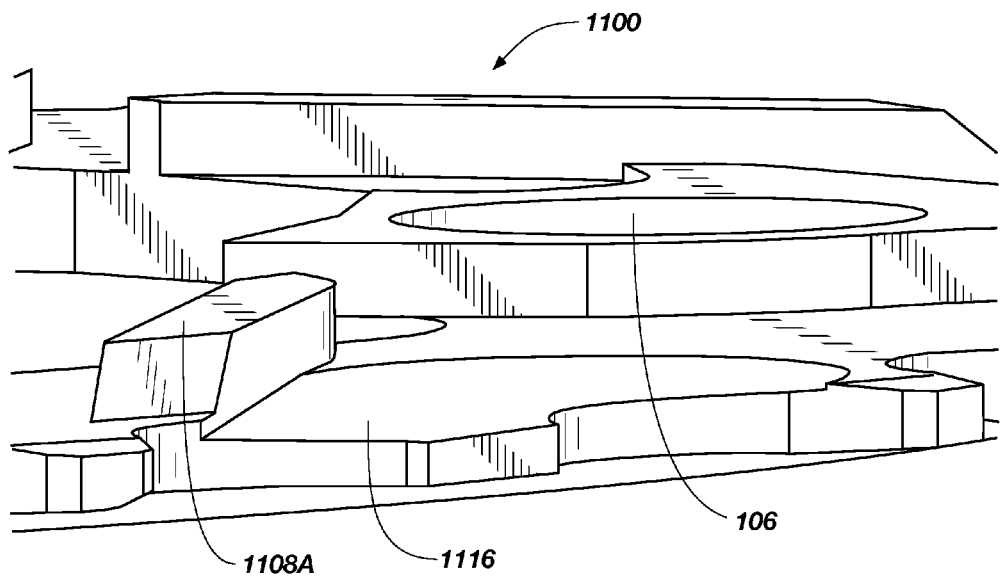
FIG. 13 is a super-enlarged perspective view of a portion of the inside of the bicycle chain ring shown in FIGS. 11-12.
Figure 14:
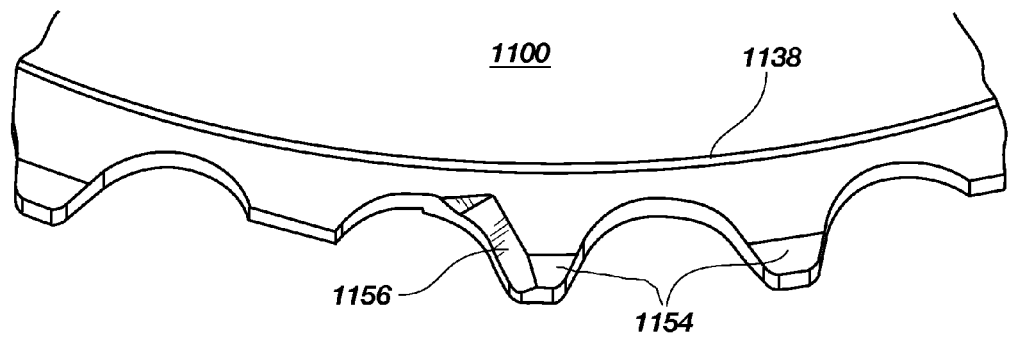
FIGS. 14-15 are enlarged perspective views of the outside of the bicycle chain ring shown in FIGS. 11-13.
Figure 15:
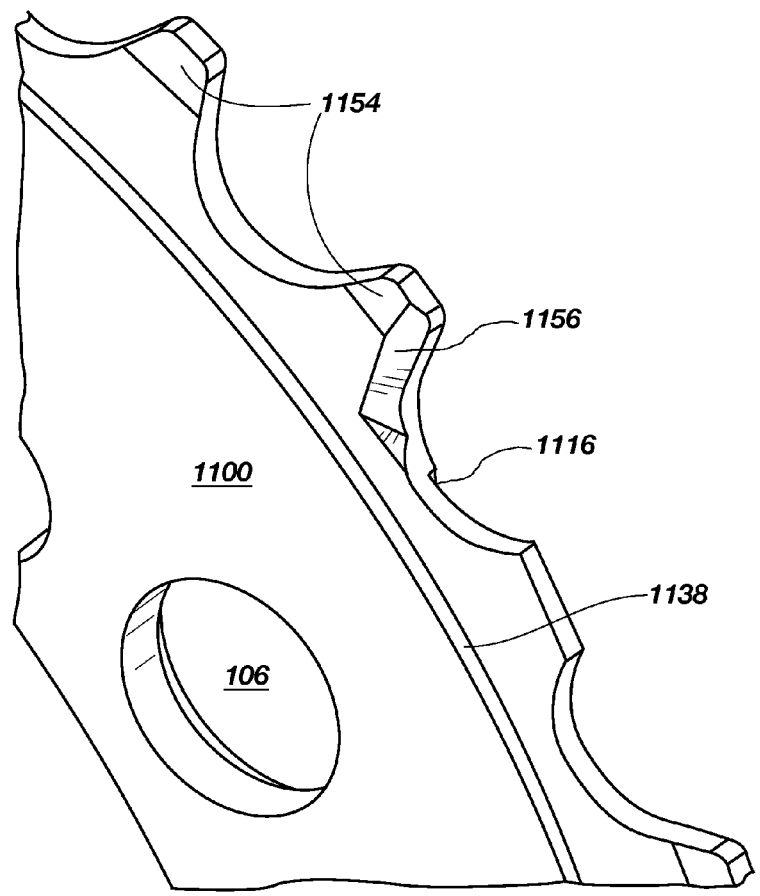

Additional embodiments of bicycle chain rings according to the present invention are shown in FIGS. 11-29. FIG. 11 is a plan view of the inside of a 32 tooth bicycle chain ring 1100 on 94 mm mounting bolt centers having five mounting bolt holes according to an embodiment of the present invention. FIG. 12 is an enlarged perspective view of a portion of the inside of the bicycle chain ring 1100 shown in FIG. 11. FIG. 12 provides an enlarged illustration of mounting hole 106, ramps 1108A and 1108B, and inside taper 1116 associated with this embodiment of a bicycle chain ring 1100. FIG. 13 is a super-enlarged perspective view of a portion of the inside of the bicycle chain ring 1100 shown in FIGS. 11-12. FIG. 13 illustrates inside taper 1116, mounting hole 106 and ramp 1108A. FIGS. 14-15 are enlarged perspective views of the outside of the bicycle chain ring 1100 shown in FIGS. 11-13. FIGS. 14-15 show an enlarged perspective view of outer ridge 1138, outside bevels 1154 and outside notch 1156. FIG. 15 also shows mounting hole 106 and an obstructed view of inside taper 1116.

It is important to note that the ramps 108, 308, 408A-B, 708A-B and 1108A-B, on the inside surface of the bicycle chain rings 100, 300, 400, 700 and 1100 disclosed herein, contact and lift the bicycle chain directly underneath the load points, i.e., chain link rollers (bushings and pins), of multiple chain links during an up-shift. Each ramp engages the bicycle chain directly below the chain link rollers and lifts at multiple load points (below each chain link roller). This is in distinct contrast to conventional bicycle chain rings with pins that attempt to accomplish the same task. Such conventional pin lifting is necessarily at a single load point (between two chain link rollers) to accomplish the bicycle chain lifting. Thus, the ramps 108, 308, 408A-B, 708A-B and 1108A-B, of the present invention spread the load over multiple load points.

Figure 16:
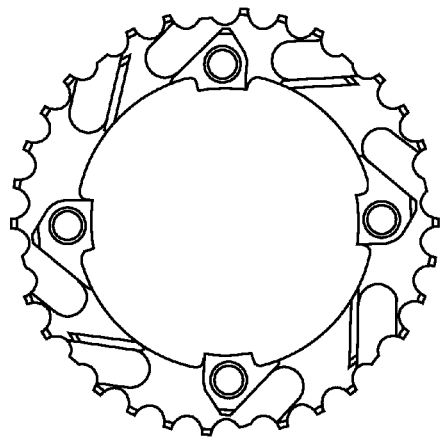
FIG. 16 is a plan view of an embodiment of a 34 tooth bicycle chain ring on 104 mm mounting bolt centers having four mounting holes according to an embodiment of the present invention.
Figure 17:
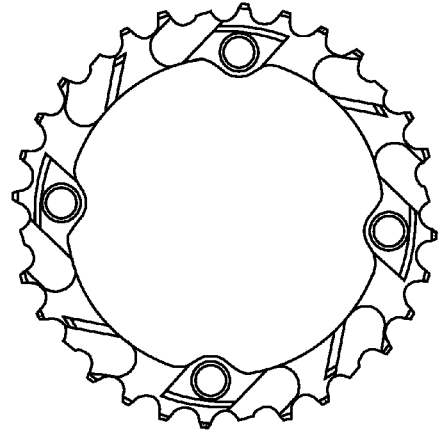
FIG. 17 is a plan view of an embodiment of a 32 tooth bicycle chain ring compatible with a four mounting hole Shimano™ XTR™ crankset according to an embodiment of the present invention.
Figure 18:
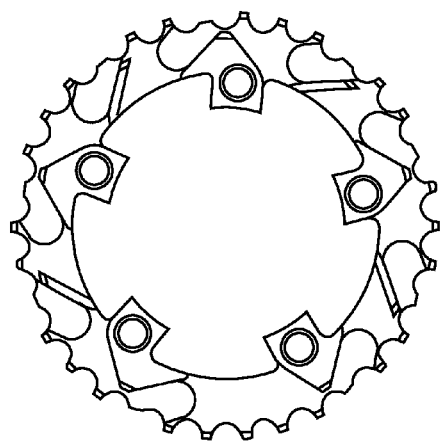
FIG. 18 is a plan view of an embodiment of a 34 tooth bicycle chain ring on 94 mm mounting bolt centers having five mounting holes according to an embodiment of the present invention.
Figure 19:
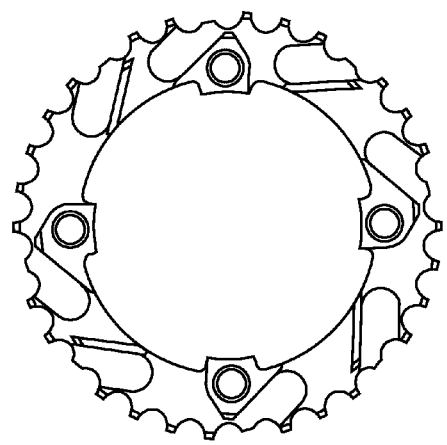
FIG. 19 is a plan view of an embodiment of a 34 tooth bicycle chain ring on 104 mm mounting bolt centers having four mounting holes according to an embodiment of the present invention.
Figure 20:
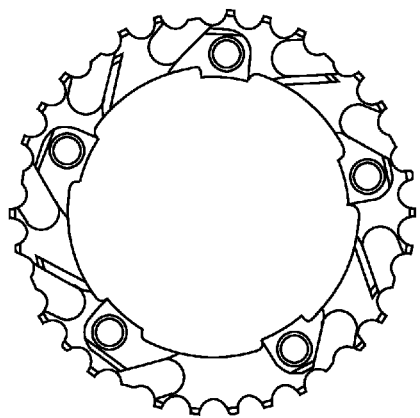
FIG. 20 is a plan view of an embodiment of a 34 tooth bicycle chain ring on 110 mm mounting bolt centers having five mounting holes according to an embodiment of the present invention.
Figure 21:
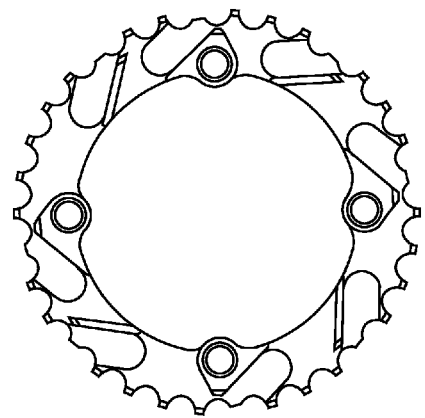
FIG. 21 is a plan view of an embodiment of a 34 tooth bicycle chain ring compatible with a four mounting hole Shimano™ XTR™ crankset according to an embodiment of the present invention.
Figure 22:
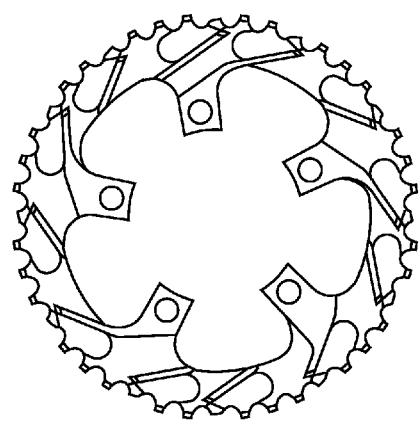
FIG. 22 is a plan view of an embodiment of a 44 tooth bicycle chain ring on 94 mm mounting bolt centers having five mounting holes according to an embodiment of the present invention.
Figure 23:
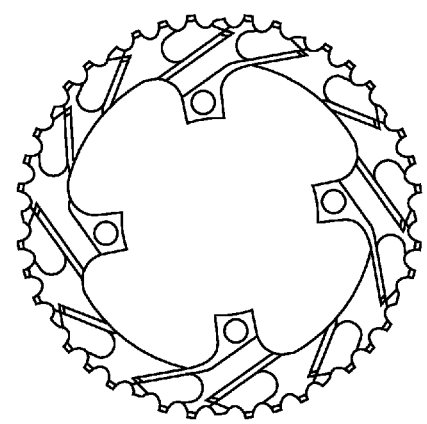
FIG. 23 is a plan view of an embodiment of a 44 tooth bicycle chain ring on 104 mm mounting bolt centers having four mounting holes according to an embodiment of the present invention.
Figure 24:
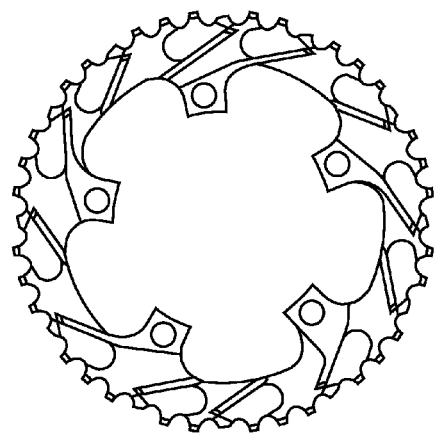
FIG. 24 is a plan view of an embodiment of a 44 tooth bicycle chain ring on 110 mm mounting bolt centers having five mounting holes according to an embodiment of the present invention.
Figure 25:
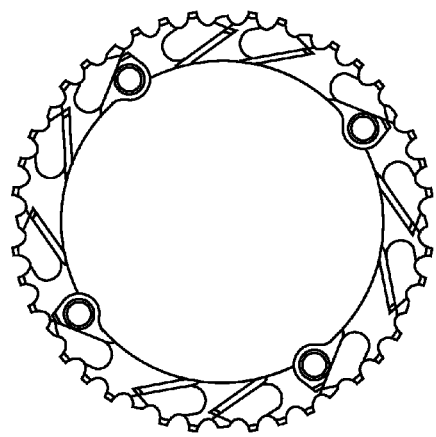
FIG. 25 is a plan view of an embodiment of a 44 tooth bicycle chain ring compatible with a four mounting hole Shimano™ XTR™ crankset according to an embodiment of the present invention.
Figure 26:
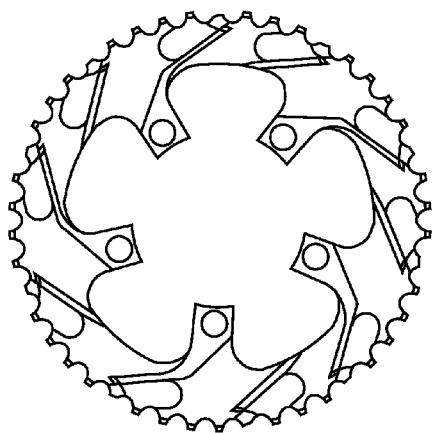
FIG. 26 is a plan view of an embodiment of a 46 tooth bicycle chain ring on 94 mm mounting bolt centers having five mounting holes according to an embodiment of the present invention.
Figure 27:
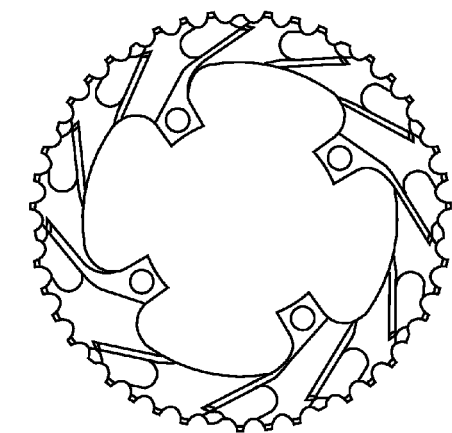
FIG. 27 is a plan view of an embodiment of a 46 tooth bicycle chain ring on 104 mm mounting bolt centers having four mounting holes according to an embodiment of the present invention.
Figure 28:
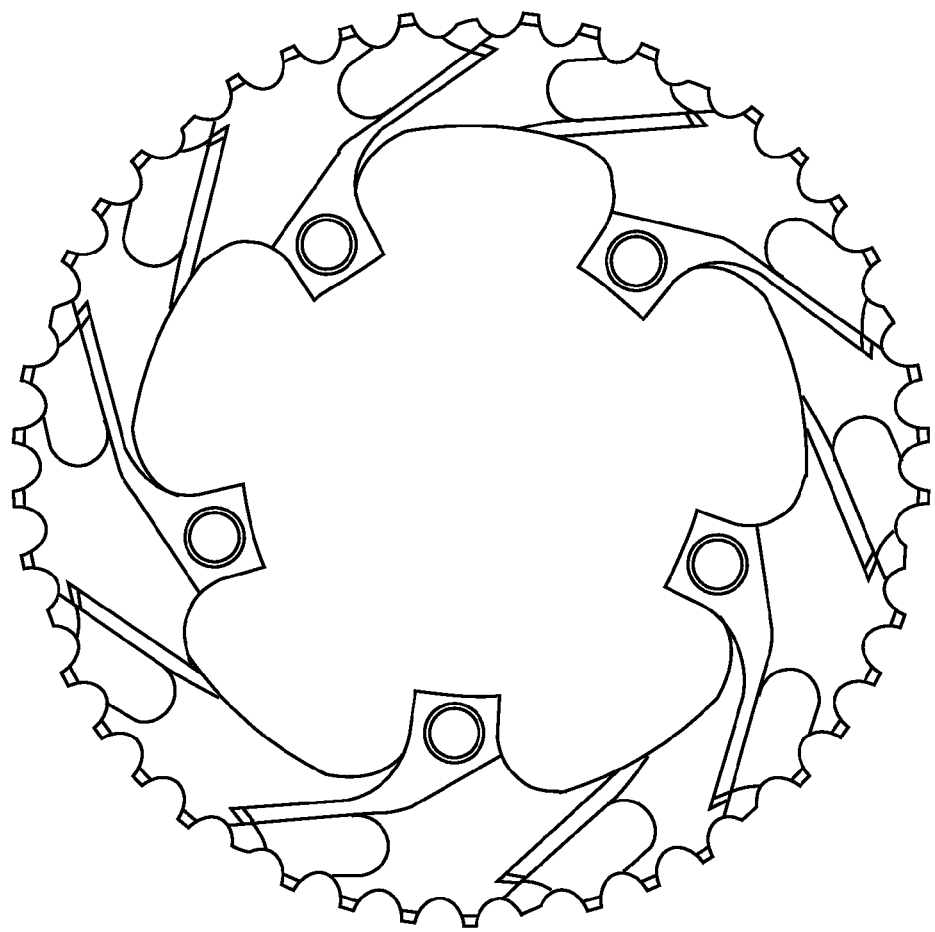
FIG. 28 is a plan view of an embodiment of a 46 tooth bicycle chain ring on 110 mm mounting bolt centers having five mounting holes according to an embodiment of the present invention.
Figure 29:
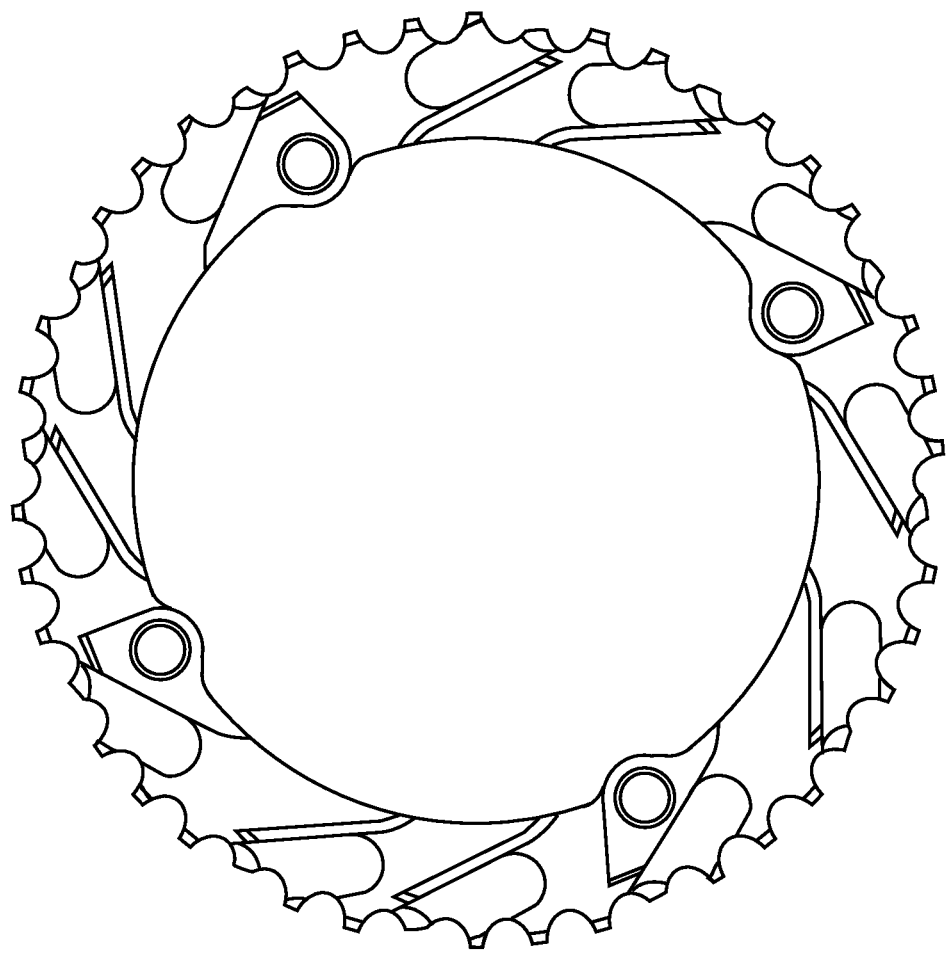
FIG. 29 is a plan view of an embodiment of a 46 tooth bicycle chain ring compatible with a four mounting hole Shimano™ XTR™ crankset according to an embodiment of the present invention.

FIG. 16 is a plan view of an embodiment of a 34 tooth bicycle chain ring on 104 mm mounting bolt centers having four mounting holes according to an embodiment of the present invention. FIG. 17 is a plan view of an embodiment of a 32 tooth bicycle chain ring compatible with a four mounting hole Shimano™ XTR™ crankset according to an embodiment of the present invention. FIG. 18 is a plan view of an embodiment of a 34 tooth bicycle chain ring on 94 mm mounting bolt centers having five mounting holes according to an embodiment of the present invention. FIG. 19 is a plan view of an embodiment of a 34 tooth bicycle chain ring on 104 mm mounting bolt centers having four mounting holes according to an embodiment of the present invention. FIG. 20 is a plan view of an embodiment of a 34 tooth bicycle chain ring on 110 mm mounting bolt centers having five mounting holes according to an embodiment of the present invention. FIG. 21 is a plan view of an embodiment of a 34 tooth bicycle chain ring compatible with a four mounting hole Shimano™ XTR™ crankset according to an embodiment of the present invention. FIG. 22 is a plan view of an embodiment of a 44 tooth bicycle chain ring on 94 mm mounting bolt centers having five mounting holes according to an embodiment of the present invention. FIG. 23 is a plan view of an embodiment of a 44 tooth bicycle chain ring on 104 mm mounting bolt centers having four mounting holes according to an embodiment of the present invention. FIG. 24 is a plan view of an embodiment of a 44 tooth bicycle chain ring on 110 mm mounting bolt centers having five mounting holes according to an embodiment of the present invention. FIG. 25 is a plan view of an embodiment of a 44 tooth bicycle chain ring compatible with a four mounting hole Shimano™ XTR™ crankset according to an embodiment of the present invention. FIG. 26 is a plan view of an embodiment of a 46 tooth bicycle chain ring on 94 mm mounting bolt centers having five mounting holes according to an embodiment of the present invention. FIG. 27 is a plan view of an embodiment of a 46 tooth bicycle chain ring on 104 mm mounting bolt centers having four mounting holes according to an embodiment of the present invention. FIG. 28 is a plan view of an embodiment of a 46 tooth bicycle chain ring on 110 mm mounting bolt centers having five mounting holes according to an embodiment of the present invention. FIG. 29 is a plan view of an embodiment of a 46 tooth bicycle chain ring compatible with a four mounting hole Shimano™ XTR™ crankset according to an embodiment of the present invention.

Figure 32A:
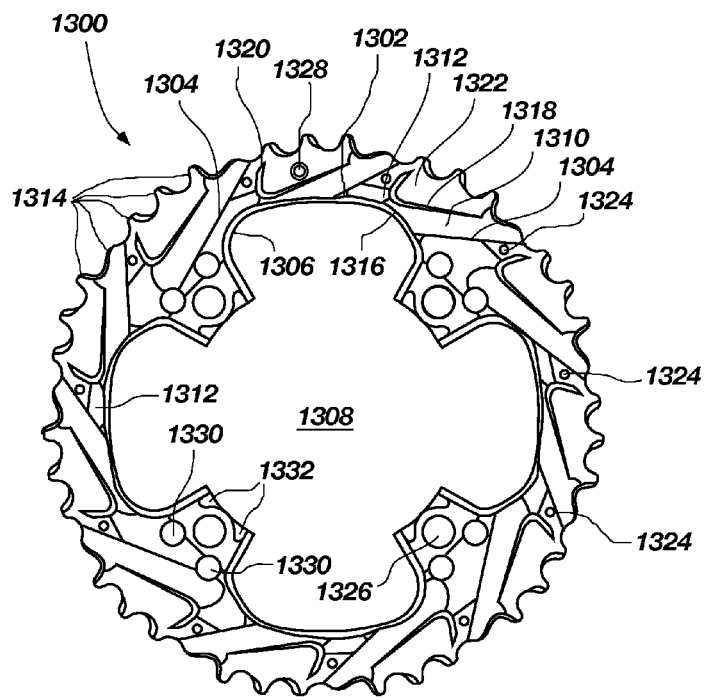
FIGS. 32A and 32B are plan views of inner and outer surfaces of a presently preferred embodiment of a 44 tooth bicycle chain ring on 104 mm mounting bolt centers (four bolts) according to the present invention.
Figure 32B:
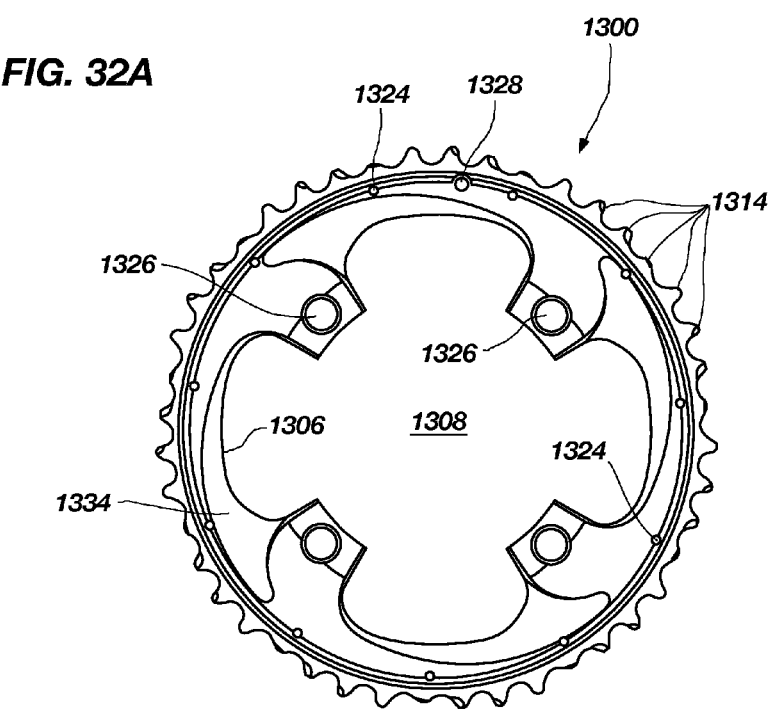
Figure 32C:
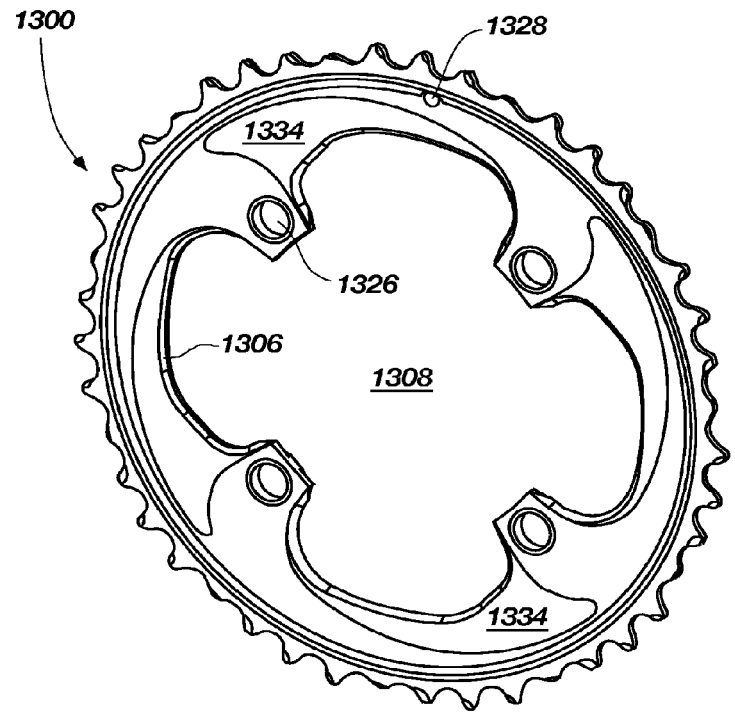
FIGS. 32C and 32D illustrate perspective views of outer and inner surfaces of the chain ring shown in FIGS. 32A and 32B.
Figure 32D:
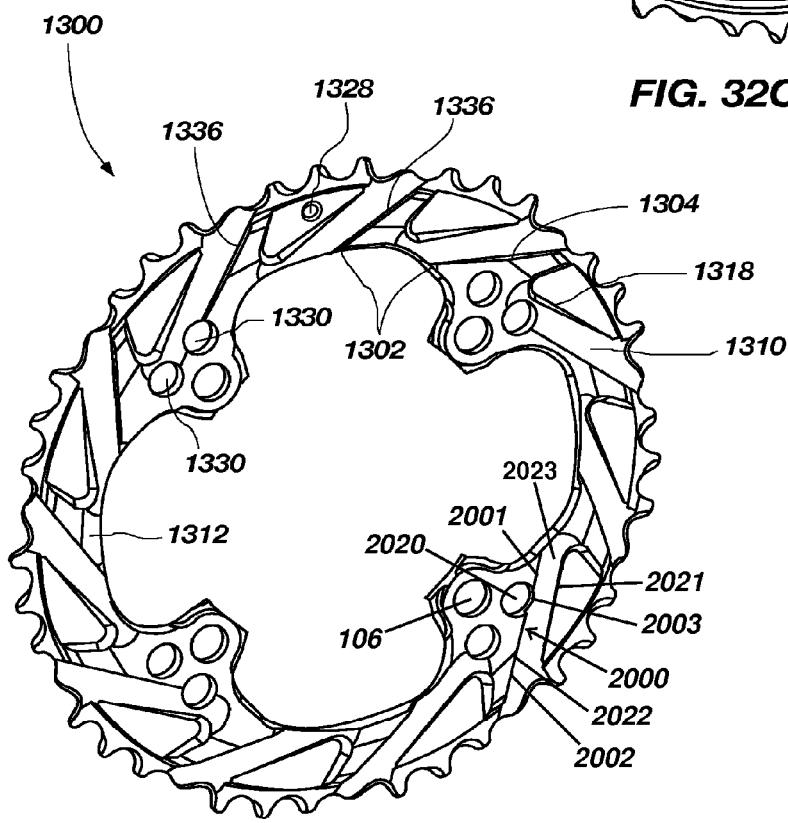

Referring now to FIGS. 32A-32B, plan views of inner and outer surfaces, respectively, of a presently preferred embodiment of a 44 tooth bicycle chain ring 1300 on 104 mm mounting bolt centers (four bolts) are shown according to the present invention. FIGS. 32C and 32D illustrate perspective views of outer and inner surfaces of chain ring 1300. FIGS. 32A-32D illustrate some previously discussed three-dimensional surface features of the present invention including ramps 1304, inner opening 1308, periphery 1306 of inner opening 1308, ramp faces 1310, contoured teeth 1314 and mounting holes 1326. FIGS. 32A and 32B also illustrate catch pin 1328 which is a feature common to most large chain rings to prevent a chain from getting caught between the chain ring and crank arm spider on an overshoot during an up-shift that can occur with an improperly adjusted front derailleur. Highlighted in FIG. 32D is a divided ramp 2000 having a first ramp portion 2001 and a second ramp portion 2002 separated by a gap 2003. The lifting surfaces of the first ramp portion 2001 and the second ramp portion 2002 are radially extending and generally coplanar. In FIG. 32D, the gap 2003 in the divided ramp 2000 is substantially defined by a hole 2020 or lightening element extending through a support structure with a mounting hole 106. In the illustrated example, the chain channel 2023 adjacent to the ramp has a leading edge 2021 of a flat guide surface that is substantially parallel to the trailing edge 2022 of the flat guide surface of the chain channel 2023. The leading edge inwardly slants from the chain channel 2023 towards the center plane 270, 370 (see FIGS. 2 and 3) while the trailing edge 2022 extends outward from the chain channel 2023 away from the center plane. The trailing edge being substantially defined by the first ramp portion 2001 and the second ramp portion 2002.

FIG. 32A also illustrates a number of additional novel features of chain ring 1300. These additional novel features of chain ring 1300 will be compared or contrasted with respect to the embodiment of a chain ring 400 shown in FIG. 4 (discussed above) which does not include these additional novel features.

One such novel feature is referred to as a "transition slide" 1302 which reduces chain snag during shifting. Each transition slide 1302 is a bevel located at a leading edge of ramp 1304 adjacent to the periphery 1306 of the inner opening 1308 in the chain ring 1300. The transition slide 1302 tapers the thickness of the leading edge of ramp 1304 from its full thickness to the surface of ramp face 1310. Transition slide 1302 smoothes or removes a sharp corner located on the leading edge of the embodiments of ramps 408A and 408B, FIG. 4. By incorporating transition slides 1302 at the leading edge of a ramp 1304, there is less opportunity for a chain (not shown in FIGS. 32A-32B) to become unintentionally snagged or dragged by the sharp corner of ramps, e.g., 408A and 408B, FIG. 4.

Another feature of chain ring 1300 is referred to herein as a "ramp bridge" 1312 which helps prevent a problem known in the bicycle industry as "chain suck", which can occur near the completion of a shift. The concept of chain suck may be explained by viewing the bicycle from the left side (from the rider's perspective), where the front derailleur is at the 1 o'clock position, to begin an up-shift during forward rotation of the crankset. As the chain climbs up the ramp and engages the contoured teeth of the larger chain ring, the chain remains on the ramp and partially still on the smaller chain ring as the crankset rotates counterclockwise. At the end of the shifting rotation, i.e., at the 6 o'clock position, of chain ring 400, the chain that is trying to fall off of the smaller chain ring, while simultaneously being pulled by the ramp 408A or 408B, will sometimes catch on the back end 425 (FIG. 4) of ramp 408A or 408B and be pulled up to the 4 o'clock or 3 o'clock position, instead of dropping off and traveling back to the rear derailleur.

Each ramp bridge 1312 forms a smoothed raised portion of the chain ring 1300 located below its associated ramp 1304, and between the ramp 1304 and an adjacent ramp lead 1318 (discussed in further detail below). The ramp bridge 1312, like transition slide 1302, helps prevent chain snags and particularly chain suck as described above during forward pedaling. Each ramp bridge 1312 also includes a trailing transition slide 1316, which, like the transition slide 1302, is a bevel or taper that smoothes the ramp bridge 1312 down to the ramp face 1310. The trailing transition slide 1316 prevents the chain from catching when backpedaling, especially cross chaining.

Still another three-dimensional feature is the ramp lead 1318 which has the appearance of a "Nike Swoosh" logo as viewed in FIG. 32A. The ramp lead 1318 is a recessed transition from the tapered trailing edge 1320 of ramp 1304 (left of "Swoosh"), to the ramp bridge 1312 (bent portion of "Swoosh") along a region roughly parallel to the next ramp 1304. The ramp lead 1318 is tapered from a flat plane region 1322 (inside of "Swoosh") to a radially tapered outside surface which forms the ramp face 1310. The tapering of the ramp lead 1318 from the flat plane region 1322 to the ramp face 1310 reduces chain drag and allows the chain (not shown) to fall along the ramp face 1310 and rest upon the ramp 1304 without snagging. The ramp leads 1318 illustrated in FIG. 32A also provide a weight savings by reducing the material on the chain ring 1300 above and below adjacent ramps 1304. It will be understood that various other embodiments of gradually smoothed structures may replace the ramp lead 1318 and flat plane region 1322 to form a smooth transition for the chain dropping onto the ramp 1304, consistent with the principles of the present invention. The perspective view of FIG. 33D illustrates lifting surfaces 1336 of ramps 1304 at approximately 11 o'clock and 12 o'clock.

Still another novel feature of chain ring 1300 is the optional incorporation of wear pins 1324 (FIGS. 32A and 32B) formed into each of the ramp 1304 structures. The wear pins 1324 may be formed of any hard material such as stainless steel or titanium. The purpose for the wear pins 1324 is to minimize wearing of the softer aluminum material from which the chain ring 1300 may be formed. Wear pins 1324 may be unnecessary for embodiments of chain rings 1300 formed of other inherently hard materials, such as titanium, stainless steel, ceramics, or carbon fiber.

FIG. 32B further illustrates cut-away regions 1334, that provide weight savings and also decorative aesthetics to the outer surface of chain ring 1300. Referring again to FIG. 32A, a plurality of "lightening pockets" 1330 or circular drill-outs (that do not pass completely through chain ring 1300) and fluting 1332 are included in regions around the mounting holes 1326. Lightening pockets 1330 and fluting 1332 do not improve shifting performance, but do reduce overall weight of chain ring 1300. The shape and configurations of all such weight-saving features 1330, 1332 and 1334 may take many forms consistent with the present invention. It will be understood that the configurations of weight-saving features 1330, 1332 and 1334 shown in FIGS. 32A and 32B are merely exemplary and not intending to be limiting of the scope of the present invention.

While the novel features discussed above have been shown with respect to a 44 tooth bicycle chain ring 1300 on 104 mm mounting bolt centers (four bolts), it will be readily apparent to one of ordinary skill in the art that such novel features may be applied to other sizes and applications of bicycle chain rings. FIGS. 33A-36E illustrate exemplary embodiments of such other sizes and applications for the novel features of the bicycle chain rings with ramps of the present invention.

Figure 33A:
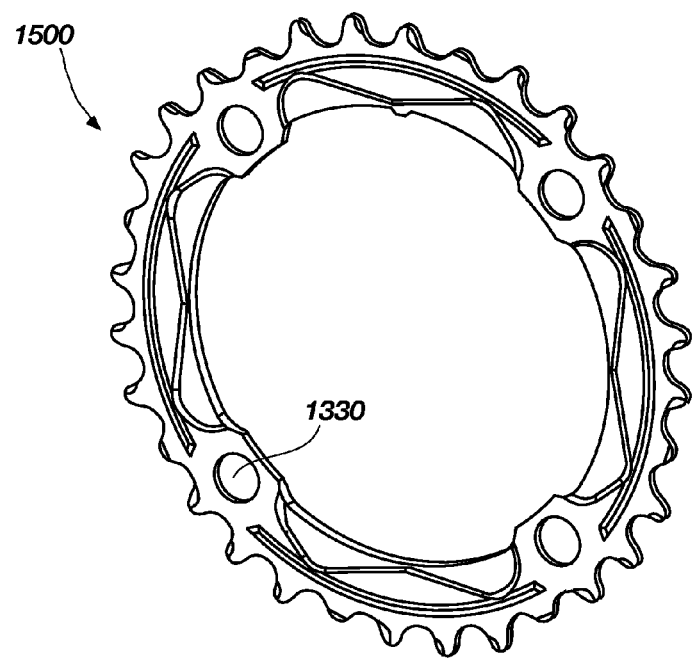
FIGS. 33A-33E are outer perspective, inner perspective, outer plan, edge and inner plan views, respectively, of a presently preferred medium mountain bike chain ring including 32 teeth on 104 mm mounting bolt centers (four bolts).
Figure 33B:
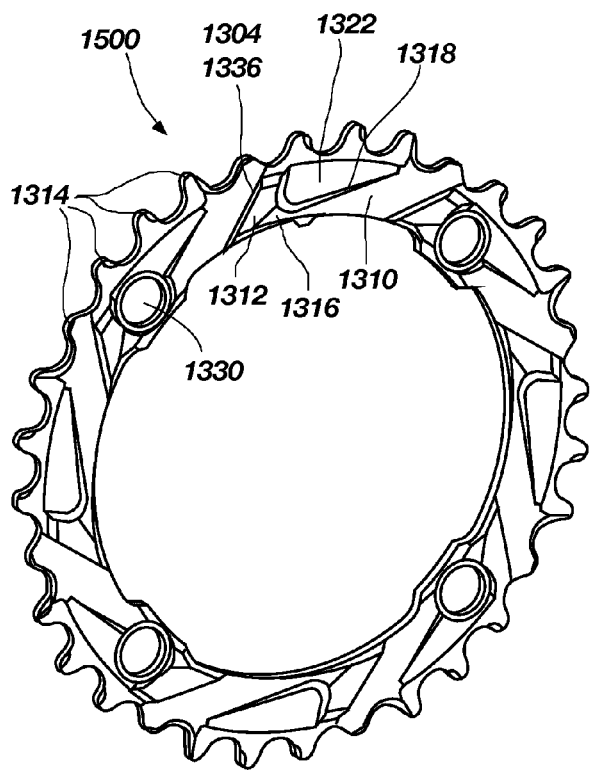
Figure 33C:
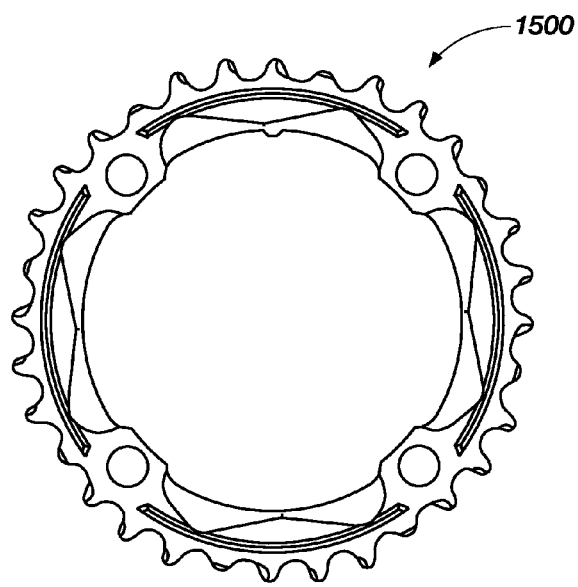
Figure 33D:
Figure 33E:
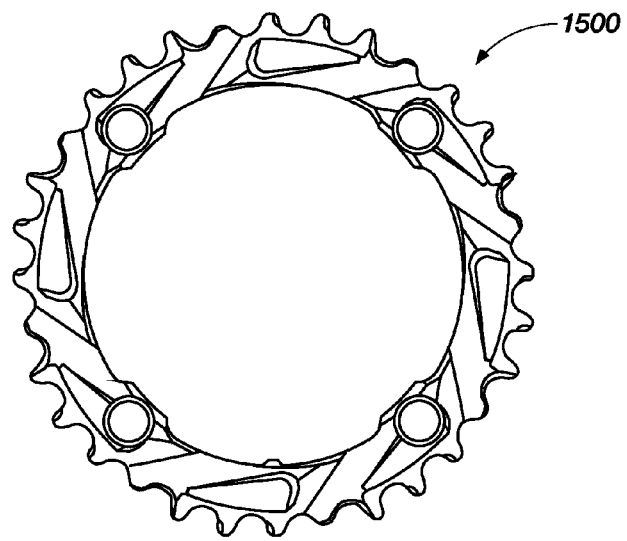

FIGS. 33A-33E are outer perspective, inner perspective, outer plan, edge and inner plan views, respectively, of a presently preferred medium mountain bike chain ring 1500 including 32 teeth on 104 mm mounting bolt centers (four bolts). In particular, FIGS. 33A and 33B, illustrate various features of chain ring 1500 including: contoured teeth 1314, lifting surface 1336 on ramp 1304, mounting holes 1330, flat plane region 1322, ramp lead 1318, ramp face 1310, ramp bridge 1312 and trailing transition slide 1316. The edge view of FIG. 33D clearly shows the three-dimensional aspect of the various surface features on both sides of chain ring 1500.

Figure 34A:
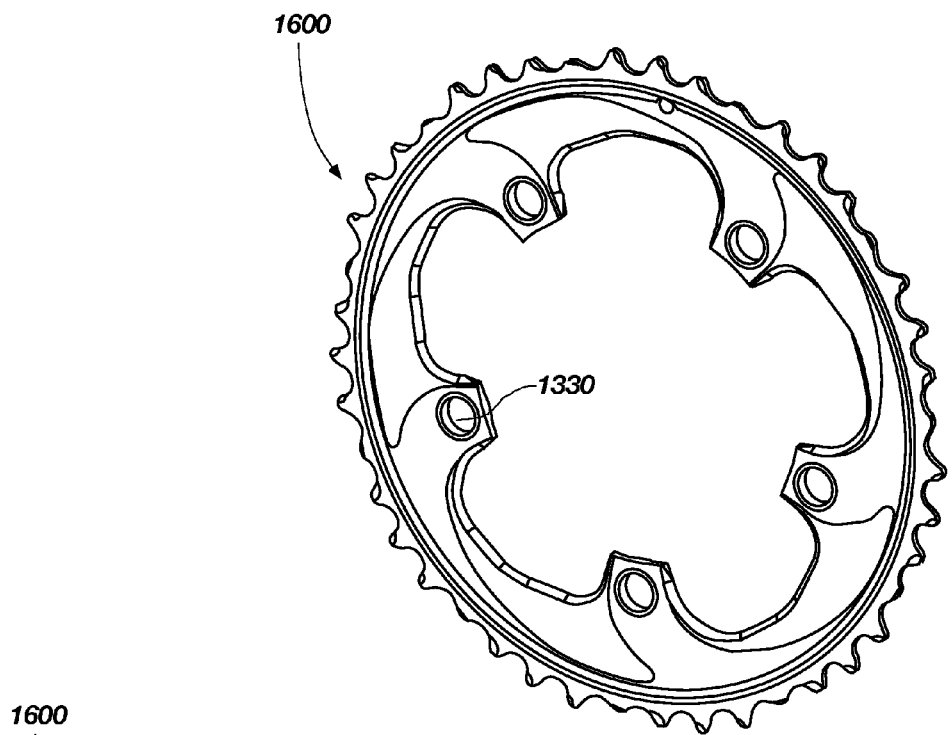
FIGS. 34A-34E are outer perspective, inner perspective, outer plan, edge and inner plan views, respectively, of a presently preferred large cyclocross bike chain ring including 44 teeth on 110 mm mounting bolt centers (five bolts).
Figure 34B:
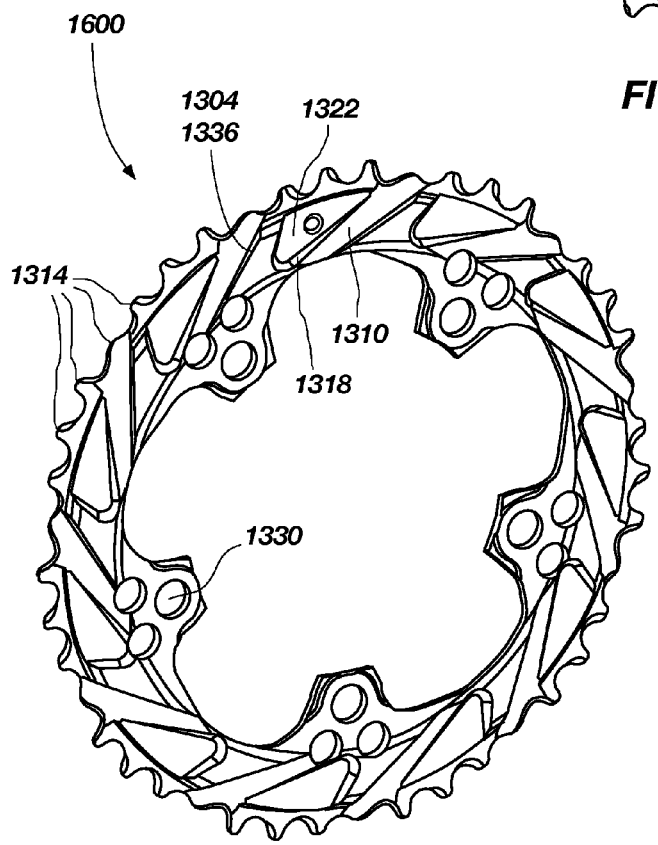
Figure 34C:
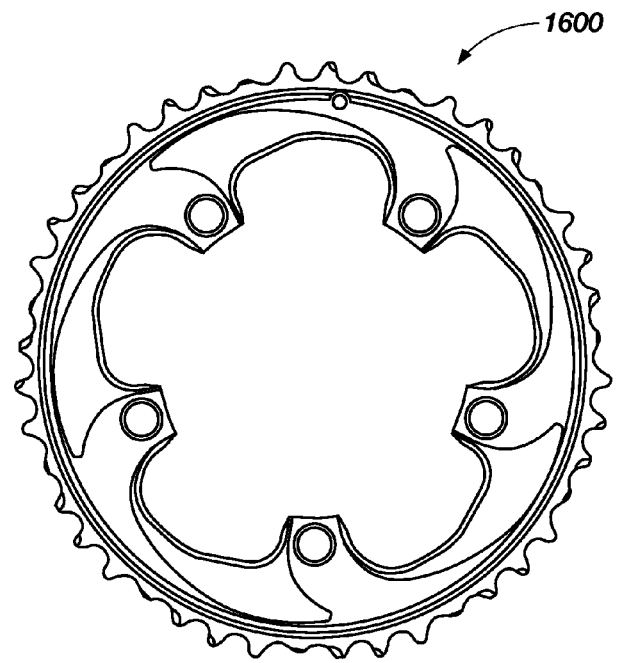
Figure 34D:
Figure 34E:
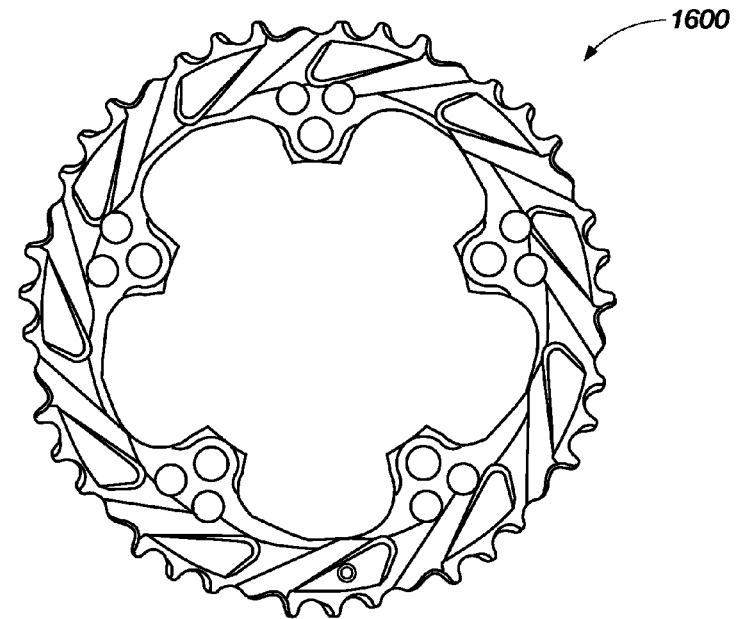

FIGS. 34A-34E are outer perspective, inner perspective, outer plan, edge and inner plan views, respectively, of a presently preferred large cyclocross bike chain ring 1600 including 44 teeth on 110 mm mounting bolt centers (five bolts). FIGS. 34A and 34B, illustrate various features of chain ring 1600 including: contoured teeth 1314, lifting surface 1336 on ramp 1304, mounting holes 1330, flat plane region 1322, ramp lead 1318 and ramp face 1310. The edge view of FIG. 34D clearly shows the three-dimensional aspect of the various surface features on both sides of chain ring 1600.

Figure 35A:
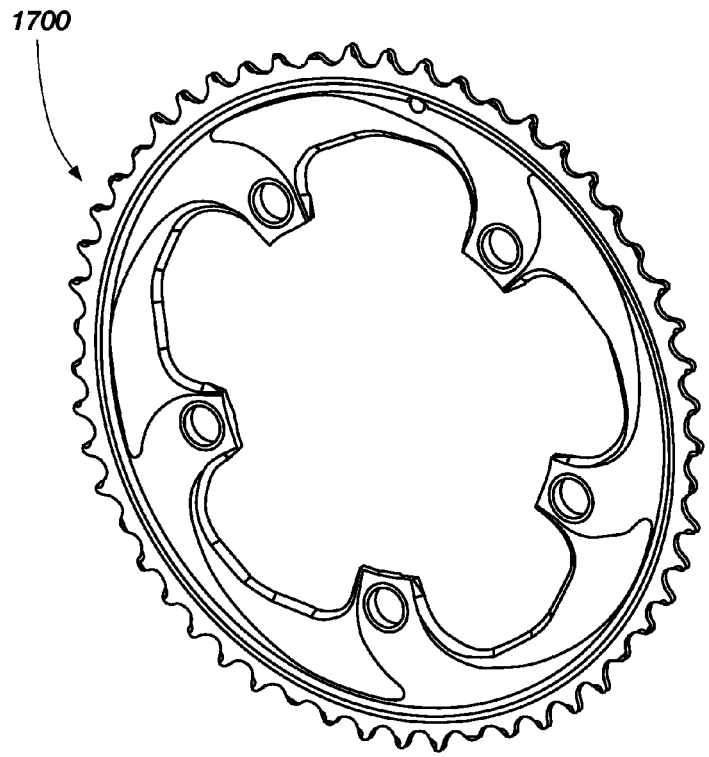
FIGS. 35A-35E are outer perspective, inner perspective, outer plan, edge and inner plan views, respectively, of a presently preferred large road bike chain ring including 53 teeth on 130 mm mounting bolt centers (five bolts).
Figure 35B:
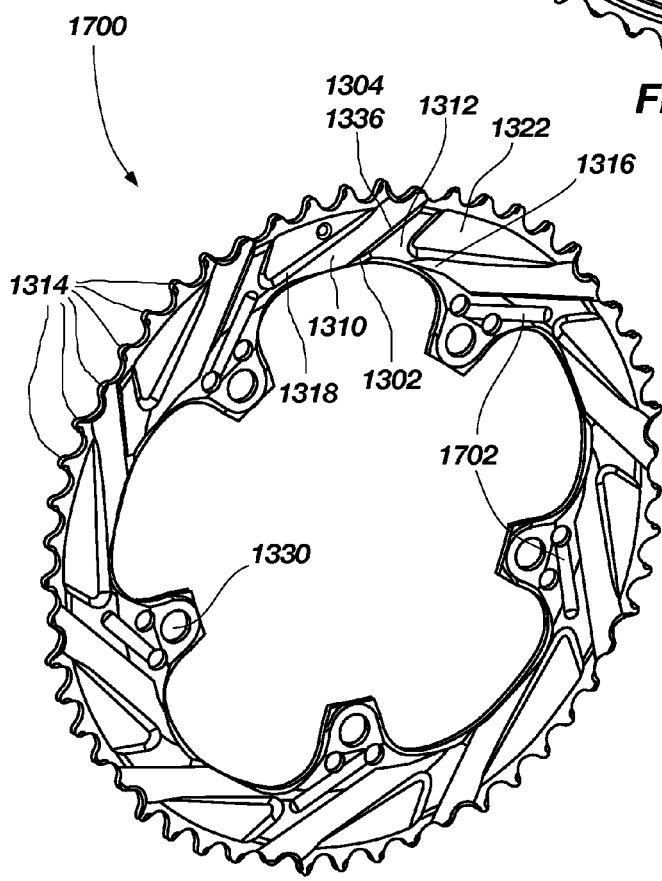
Figure 35C:
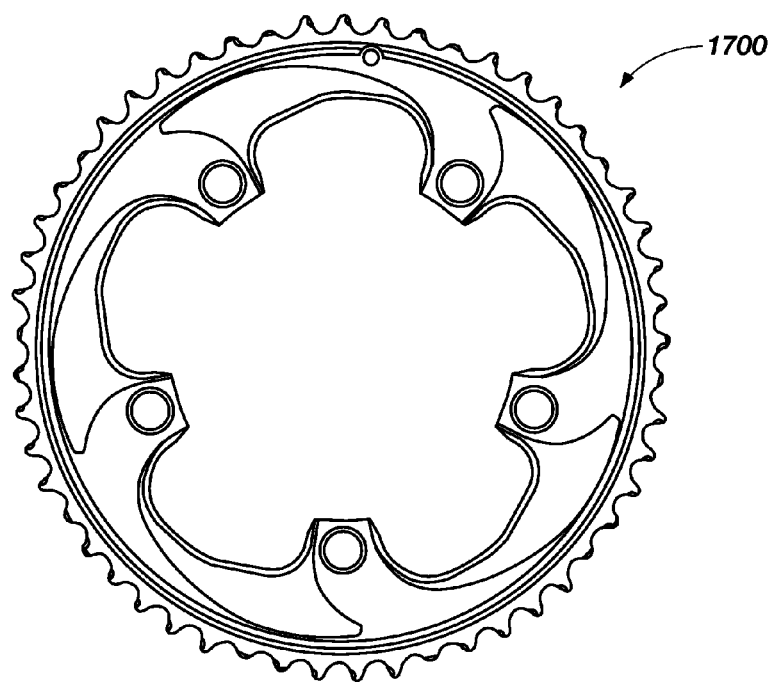
Figure 35D:
Figure 35E:
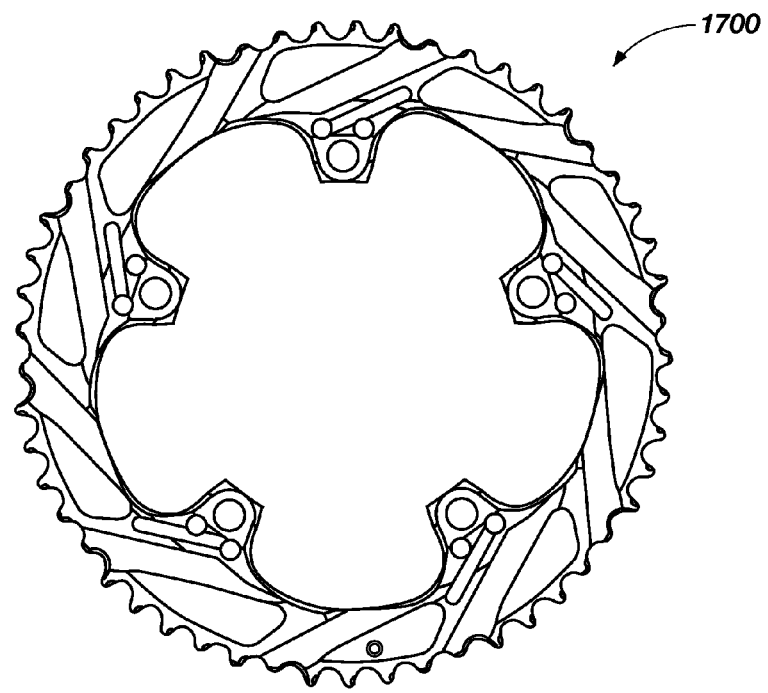

FIGS. 35A-35E are outer perspective, inner perspective, outer plan, edge and inner plan views, respectively, of a presently preferred large road bike chain ring 1700 including 53 teeth on 130 mm mounting bolt centers (five bolts). FIGS. 35A and 35B, illustrate various features of chain ring 1700 including: contoured teeth 1314, lifting surface 1336 on ramp 1304, transition slide 1302, mounting holes 1330, flat plane region 1322, ramp lead 1318, ramp face 1310, ramp bridge 1312 and trailing transition slide 1316. FIGS. 35B and 35E further illustrate linear fluting 1702 for weight reduction. The edge view of FIG. 35D clearly shows the three-dimensional aspect of the various surface features on both sides of chain ring 1700.

Figure 36A:
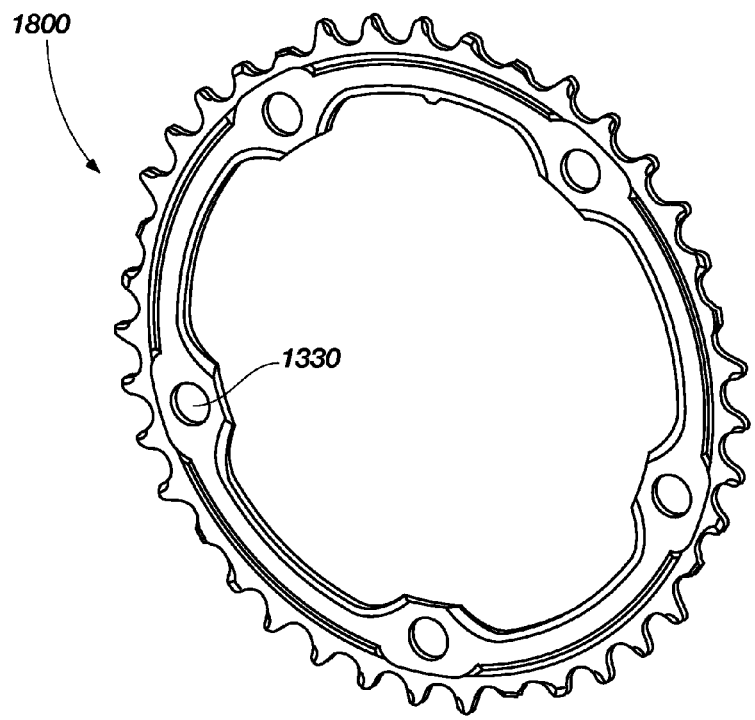
FIGS. 36A-36E are outer perspective, inner perspective, outer plan, edge and inner plan views, respectively, of a presently preferred medium road bike chain ring including 39 teeth on 130 mm mounting bolt centers (five bolts).
Figure 36B:
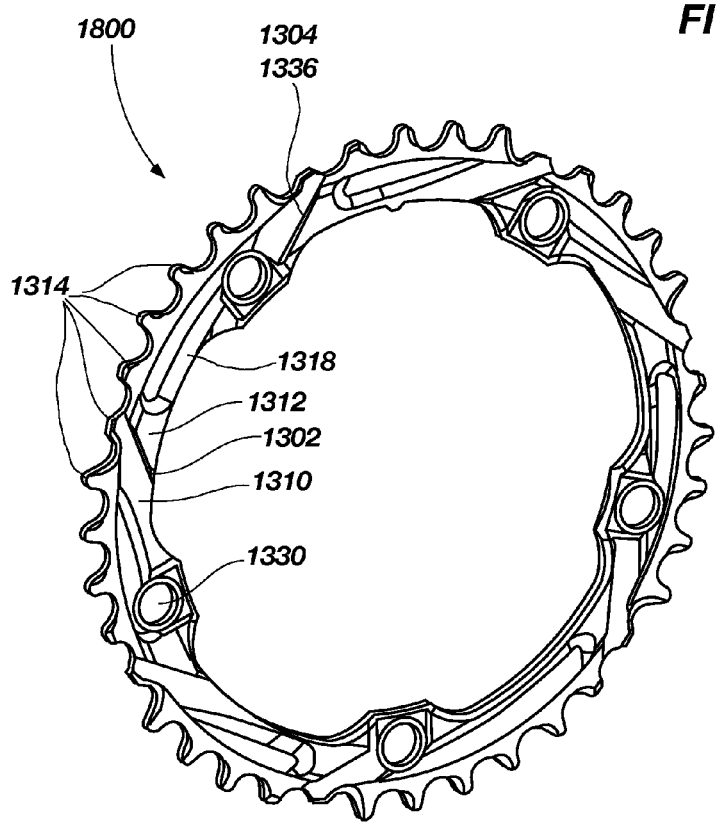
Figure 36C:
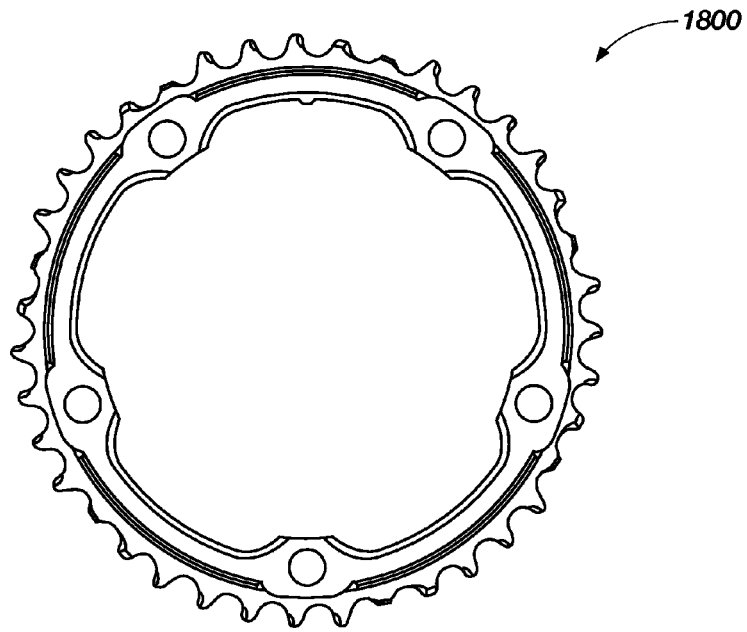
Figure 36D:
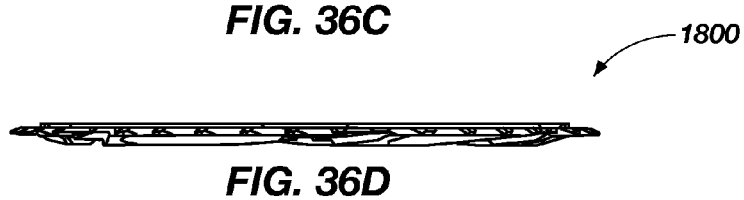
Figure 36E:
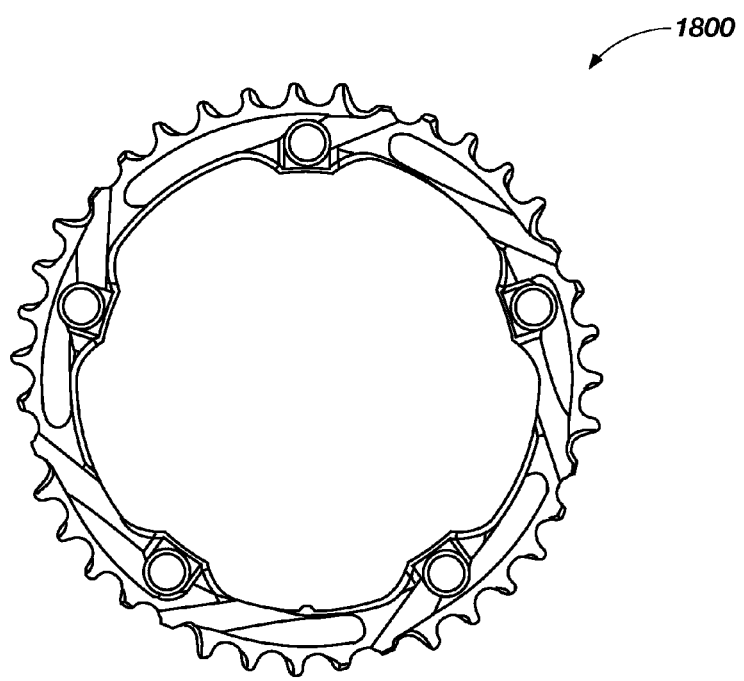

FIGS. 36A-36E are outer perspective, inner perspective, outer plan, edge and inner plan views, respectively, of a presently preferred medium road bike chain ring 1800 including 39 teeth on 130 mm mounting bolt centers (five bolts). FIGS. 36A and 36B, illustrate various features of chain ring 1800 including: contoured teeth 1314, lifting surface 1336 on ramp 1304, transition slide 1302, mounting holes 1330, flat plane region 1322, ramp lead 1318, ramp face 1310 and ramp bridge 1312. The edge view of FIG. 36D clearly shows the three-dimensional aspect of the various surface features on both sides of chain ring 1800.

Figure 37:
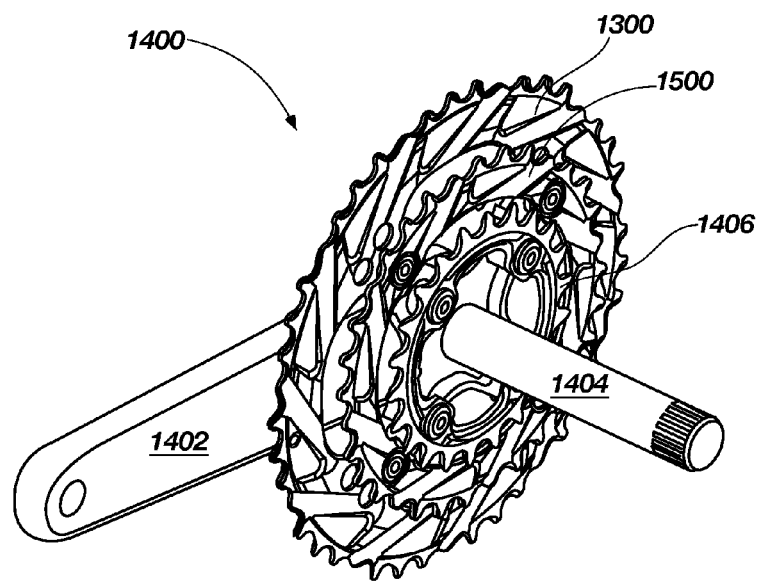
FIG. 37 is a perspective view of a partial crankset assembly illustrating assembled embodiments of chain rings according to the present invention.

FIG. 37 is a perspective view of a partial crankset assembly 1400 illustrating assembled embodiments of chain rings according to the present invention. The partial crankset assembly 1400 includes a crank arm spider 1402, a bottom bracket spindle 1404, a large mountain bike chain ring 1300, a medium mountain bike chain ring 1500 and a small mountain bike chain ring 1406. A complete mountain bike crankset (not shown) would include another crank arm (not shown to simplify FIG. 37) that would be configured to attach to the bottom bracket spindle 1404. Such crank arms are well known to those of ordinary skill in the art.

Figure 38:
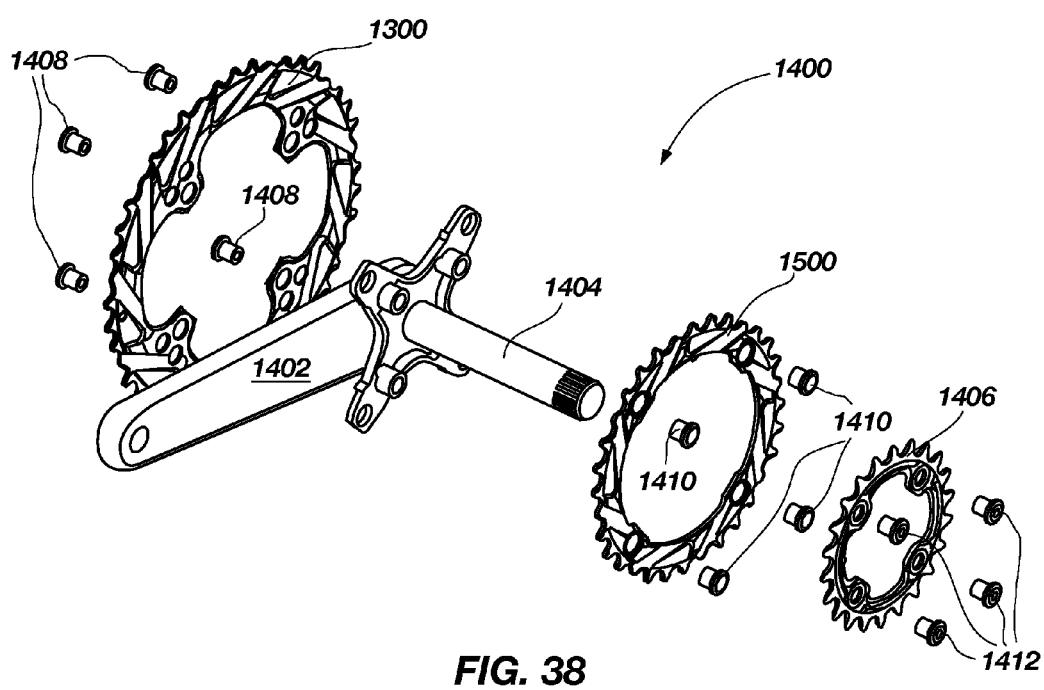
FIG. 38 is an exploded view of the partial crankset assembly of FIG. 37.

FIG. 38 is an exploded view of the partial crankset assembly 1400 of FIG. 37. FIG. 38 illustrates a crank arm spider 1402, a bottom bracket spindle 1404, a large mountain bike chain ring 1300, a medium mountain bike chain ring 1500, a small mountain bike chain ring 1406 and fasteners 1408, 1410 and 1412. Fasteners 1408, 1410 and 1412 may be nuts and bolts of any suitable kind known to those of ordinary skill in the art.

While the foregoing advantages of the present invention are manifested in the illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A bicycle chain ring for engaging a bicycle chain having a plurality of chain links each with an outer link having a first load point separated from a second load point by a first distance, the bicycle chain ring comprising:
   an inner opening fully circumscribing an axis of rotation;
   a plurality of ramps disposed about an inner surface of the bicycle chain ring,
   wherein each of the plurality of ramps is configured with a linear lifting surface having a length greater than the first distance,
   each of the linear lifting surfaces
      being aligned along one of a plurality of linear tangents of a geometric circle having a center at the axis of rotation, and
      extending directly from the inner opening.

2. The bicycle chain ring according to claim 1,
   wherein at least one of the linear lifting surfaces is planar in profile when viewed along the axis of rotation; and
   wherein ramp structural thickness as measured perpendicular from an inside surface of the bicycle chain ring to a top surface of a ramp ranges from 2 mm to 5 mm.

3. The bicycle chain ring of claim 1 further comprising a wear pin located adjacent to one of the plurality of linear tangents aligned with one of the linear lifting surfaces.

4. A method for up-shifting a bicycle chain with a link height from a smaller bicycle chain ring to a larger bicycle chain ring, comprising: providing the larger bicycle chain ring, comprising:
   a plurality of ramps outwardly disposed from a first surface of the larger bicycle chain ring; and
   wherein each of the plurality of ramps is configured with a lifting surface, and
   a chain channel bounded by
      a first lifting surface of a first of the plurality of ramps on a trailing edge,
      an element inwardly disposed from the inner surface on a leading edge, and
      a flat guide surface of the first surface, the flat guide surface located between the element and the first lifting surface;
   wherein
      the minimum width of the chain channel from the first lifting surface to the element is greater than the link height of the bicycle chain; and
      the separation of the first lifting surface from the element is less than twice the link height of the bicycle chain;
   rotating a crankset including the smaller and the larger bicycle chain rings in a forward motion direction;
   urging the bicycle chain toward the first surface of the larger bicycle chain ring; the bicycle chain engaging the lifting surface at two or more distinct load points simultaneously, the load points located directly beneath chain pivots;
   initiating stable lift of the bicycle chain off of the smaller bicycle chain ring without assistance from larger bicycle chain ring teeth; and the bicycle chain finally engaging the larger bicycle chain ring teeth.

5. A bicycle chain ring, comprising
   a plurality of lifting ramps disposed about an inner surface of the bicycle chain ring,
   each lifting ramp is configured to concurrently initiate engagement with two or more load points of a bicycle chain below bicycle chain link pins, thereby initiating stable lift to the bicycle chain without assistance from chain ring teeth during an up-shift; and
   wherein each lifting ramp includes a first linear lifting surface, and
   a first lifting ramp includes a second linear lifting surface separated from the first linear lifting surface of first lifting ramp by the a first gap,
   wherein the second lifting surface and the first lifting surface of the first lifting ramp are coplanar.

6. The bicycle chain ring according to claim 5, wherein
   at least one lifting ramp begins at a first radius measured from an axis of rotation and ends at a second radius measured from the axis of rotation,
   a pin is located adjacent to the first lifting surface of a second lifting ramp, and
   the first radius less than the second radius.

7. The bicycle chain ring according to claim 5 further comprising:
   a ramp face directly contacting a second lifting ramp, the ramp face including
      a first planar surface directly contacting the second lifting ramp,
      a second planar surface directly contacting the second lifting ramp,
      the second planar surface connecting to the first planar surface at a transition,
      wherein the first planar surface is noncoplanar with the second planar surface; and
   at least one lifting ramp begins at a first radius measured from an axis of rotation and ends at a second radius measured from the axis of rotation, and
   wherein the first radius is greater than a smaller adjacent chain ring radius.

8. The bicycle chain ring of claim 5 wherein
   a circular hole fully extending through the bicycle chain ring defines at least a portion of the first gap.

9. The bicycle chain ring of claim 5 wherein
   a lightening pocket in a structural member with a mounting hole defines at least a portion of the first gap.

10. A bicycle chain ring for engaging a bicycle chain having a plurality of chain links each with a link height and a link length, the bicycle chain ring comprising an axis of rotation;
   a plurality of ramps disposed about an inner surface of the bicycle chain ring, the inner surface of the bicycle chain ring circumscribing a geometric circle with a center at the axis of rotation,
   wherein each of the plurality of ramps is configured with a flat lifting side protruding from the inner surface,
      the flat lifting side
         tapering and extending along one of a plurality of linear tangents of the geometric circle,
         placed to engage and lift a bicycle chain during an up-shift,
         having a length greater than the link length, and
         configured to engage the chain at two or more load points along a length of the chain at all times during the up-shift, the load points being directly under chain pivot axes; and
   a chain channel for guiding the bicycle chain to a tooth of the bicycle chain ring,
   the chain channel at least partially bounded by
      the flat lifting side of a first of the plurality of ramps and
      a portion of the inner surface located directly adjacent to the flat lifting side of the first of the plurality of ramps, and
   wherein the chain channel has a minimum width from the flat lifting side of the first of the plurality of ramps greater than the link height.

11. The bicycle chain ring according to claim 10, wherein
the lifting side begins at a first radius as measured from an axis of rotation and extends outward to a second radius,
the second radius greater than the first radius;
the first radius is greater than a smaller adjacent chain ring radius; and
the lifting side begins from an inner radial position where the bicycle chain is carried by a smaller adjacent chain ring and ends radially outward at a radius ending before reaching bottoms of troughs between chain ring teeth.

12. A bicycle chain ring, comprising
a plurality of ramps disposed about an inner surface of the bicycle chain ring, wherein
each of the plurality of ramps is configured with a lifting surface extending outward from the inner surface and toward a smaller adjacent chain ring,
a first of the lifting surfaces beginning at an inner periphery of the bicycle chain ring and extending radially outward from an axis of rotation,
a ramp face portion of the inner surface directly contacting the first of the lifting surfaces, the ramp face portion including
a first planar surface directly contacting the first of the lifting surfaces,
a second planar surface directly contacting the first of the lifting surfaces,
the second planar surface connecting to the first planar surface at a transition,
wherein the first planar surface is noncoplanar with the second planar surface; and
the inner periphery defining an innermost edge of the chain ring relative to an axis of rotation.

13. The bicycle chain ring of claim 12 wherein
the width of the first of the lifting surfaces
at all portions adjacent to the first planar surface
is greater than
the width of the first of the lifting surfaces
at any portion adjacent to the second planar surface.

14. The bicycle chain ring of claim 12 wherein
the first of the lifting surfaces is non-linear in profile.

15. A bicycle chain ring, comprising
a plurality of ramps disposed about an inner surface of the bicycle chain ring,
wherein each of the plurality of ramps is configured with a lifting side protruding from the inner surface toward a smaller adjacent chain ring, and
extending from a first radial position where a bicycle chain is carried by the smaller chain ring outward to an outer radius as measured from an axis of rotation,
the outer radius ending before bottoms of troughs between chain ring teeth,
the lifting side
having a first lifting surface separated from a second lifting surface by a gap, wherein the first and second lifting surfaces are coplanar and the maximum width of the first lifting surface is greater than the maximum width of the second lifting surface, and
having placement and length sufficient to engage and to lift the bicycle chain at two or more chain load points during an up-shift, the load points being directly under chain pivot axes.

16. The bicycle chain ring of claim 15 further comprising
a pin located adjacent to the first lifting surface.

17. The bicycle chain ring of claim 15 wherein
a hole extending through the bicycle chain ring defines at least a portion of the gap.

18. The bicycle chain ring of claim 15 wherein
a lightening pocket in a structural member with a mounting hole defines at least a portion of the gap.

19. A bicycle chain ring configured to engage with a bicycle chain having a plurality of pivots spaced at a first spacing distance, the bicycle chain ring comprising
a plurality of ramps disposed about an inner surface of the bicycle chain ring,
wherein each of the plurality of ramps is configured with a linear lifting surface protruding from the inner surface sufficient to engage the bicycle chain,
the linear lifting surface beginning from an inner radius measured from an axis of rotation outward to where the bicycle chain is carried by a smaller adjacent chain ring,
the linear lifting surface ending before reaching an outer radius measured from the axis out toward, but ending before reaching, bottoms of troughs between chain ring teeth, the linear lifting surface placed to contact and lift a bicycle chain at two or more load points simultaneously,
each load point located underneath a chain pivot on a line perpendicular to the lifting surface and passing through a chain pivot axis, and
wherein
each of the linear lifting surfaces is aligned with one of a plurality of linear tangents of a geometric circle; and
each of the ramps has a total linear lifting surface length greater than the first spacing distance.

20. The bicycle chain ring of claim 19 further comprising
a ramp face portion of the inner surface directly contacting
a first of the lifting surfaces, the ramp face portion including
a first planar surface directly contacting the first of the lifting surfaces,
a second planar surface directly contacting the first of the lifting surfaces,
the second planar surface connecting to the first planar surface at a transition,
wherein the first planar surface is noncoplanar with the second planar surface.

21. The bicycle chain ring of claim 19 wherein
a first of the plurality of ramps includes a first linear lifting surface separated from a second linear lifting surface by a gap,
the first linear lifting surface being coplanar with the second linear lifting surface, and
the first linear lifting surface having a length less than the first spacing distance.

22. A bicycle chain ring for engaging a bicycle chain having a chain link height, the bicycle chain ring comprising
a plurality of ramps disposed about an first surface of the bicycle chain ring,
wherein each of the plurality of ramps is configured with
a lifting surface outwardly rising perpendicularly from the first surface and adapted to contact and lift a bicycle chain at three or more load points,
a flat guide path on the first surface directly contacting the lifting surface, the flat guide path bounded on a trailing edge by the lifting surface and on a leading edge by an a ramp lead inwardly slanting from the flat guide path, wherein the leading edge is parallel to the trailing edge;
the load points located underneath chain pivots on a line perpendicular to the lifting surface and passing through chain pivot axes.

* * * * *